US010325311B2

(12) United States Patent
Zimmer et al.

(10) Patent No.: US 10,325,311 B2
(45) Date of Patent: Jun. 18, 2019

(54) SYSTEMS AND COMPUTER-IMPLEMENTED PROCESSES FOR ANALYZING AND DETERMINING THE VALUE OF SWITCHING ACCOUNTS

(71) Applicant: Capital One Financial Corporation, McLean, VA (US)

(72) Inventors: Scott L. Zimmer, Charlotte, NC (US); Gagan Kanjlia, Ashburn, VA (US); Vishal Puri, Ashburn, VA (US); Michael B. Kiernan, Fairfax, VA (US); Matthew H. Purdin, Arlington, VA (US); Rabin Bhattacharya, Kensington, MD (US); Jay F. Pober, Cherry Hill, NJ (US)

(73) Assignee: CAPITAL ONE FINANCIAL CORPORATION, McLean, VA (US)

( * ) Notice: Subject to any disclaimer, the term of this patent is extended or adjusted under 35 U.S.C. 154(b) by 0 days.

(21) Appl. No.: 13/969,891

(22) Filed: Aug. 19, 2013

(65) Prior Publication Data
US 2014/0052595 A1    Feb. 20, 2014

Related U.S. Application Data

(60) Provisional application No. 61/691,146, filed on Aug. 20, 2012.

(51) Int. Cl.
*G06Q 30/00* (2012.01)
*G06Q 40/02* (2012.01)
(Continued)

(52) U.S. Cl.
CPC .......... *G06Q 40/02* (2013.01); *G06Q 20/108* (2013.01); *G06Q 20/227* (2013.01); *G06Q 20/405* (2013.01)

(58) Field of Classification Search
CPC ........................................................ G06F 12/60
(Continued)

(56) References Cited

U.S. PATENT DOCUMENTS 7,117,172 B1 * 10/2006 Black ..................... G06Q 40/00
705/35
7,606,752 B2 * 10/2009 Hazlehurst ........... G06Q 20/102
705/35

(Continued)

OTHER PUBLICATIONS

NPL search.*

*Primary Examiner* — John H. Holly
(74) *Attorney, Agent, or Firm* — Finnegan, Henderson, Farabow, Garrett & Dunner, L.L.P.

(57) ABSTRACT

The disclosed embodiments include systems and methods for customer account switching valuation. The disclosed embodiments include a customer account switching valuation computer system that includes a storage device storing instructions and a processor configured to execute the instructions in the storage device. In one aspect, the system may receive, from a client computer associated with a customer, a response to an offer to switch an existing account to a new account and collect, based on the response, account information relating to the existing account. The processor may be configured to parse the collected account information into one or more categories and analyze the categorized account information to determine a value to the customer for switching from the existing account to the new account. The processor may also provide a representation of the value to the client computer.

20 Claims, 19 Drawing Sheets

(51) Int. Cl.
*G06Q 20/10* (2012.01)
*G06Q 20/22* (2012.01)
*G06Q 20/40* (2012.01)

(58) Field of Classification Search
USPC .......... 705/1.1, 35, 38, 39, 14.3, 29, 44, 30; 235/379, 380, 493; 709/101, 207
See application file for complete search history.

(56) References Cited

U.S. PATENT DOCUMENTS

| | | | | |
|---|---|---|---|---|
| 7,848,974 | B1* | 12/2010 | Sheehan | G06Q 30/04 705/35 |
| 8,121,947 | B1* | 2/2012 | Barth | G06Q 20/102 705/40 |
| 2005/0021456 | A1* | 1/2005 | Steele | G06Q 20/04 705/39 |
| 2008/0091591 | A1* | 4/2008 | Egnatios et al. | 705/38 |

* cited by examiner

FIG. 7

Sounds great, but it's not worth the hassle of switching, right?

As a matter of fact, it's not that difficult. Here's why:

According to your uploaded information, you have:

- 2 Direct Deposits -- At the click of a mouse we can switch this over to the new account. No forms to fill out!
- 8 Bill Pays: We can help you switch these over automatically. On average it takes just 30 seconds per Payee!
- 10 Automated Payments: Again, at the click of a mouse we'll notify your biller and have payments be taken out of your new account.

And don't worry about the timing or whether you'll have the $$ to cover bills in your New Account before you transfer your money from your old account. No payments will hit your account until your Direct Deposit is established, and we'll even let you overdraft up to $2,000 for free just in case (of course you have to pay it back eventually!).

| | |
|---|---|
| Interest Earned | $20.00 |
| Maintenance Fees Saved | $90.00 |
| ATM Fees Saved | $0.00 |
| Overdraft Fees Saved | $69.57 |
| Total $$ Earned | $149.57 |

FIG. 11B

| 1310 | What is the average amount you keep in your checking account? | $10,000 |

| 1320 | Do you pay any checking account monthly fee? | ○ $0  ○ $5  ● $10  ○ $15  ☒ $20 |

| 1330 | | Current Bank |
|---|---|---|
| | Annual Cycle Fee Amount | $120.00 |

| 1340 | How much in overdrafts fees have you paid in the last three months? | 1 |

| 1350 | How many checks have you deposited at teller or ATM in the last 3 months? | 5 |

| 1361 | Annual Interest Savings | $20.00 |
| 1362 | Annual Fee Savings | $189.57 |
| 1363 | Total Annual Savings | $209.57 |

| 1370 | What is the interest rate (APY) on your checking account? | 0.00% |

| 1380 | How many times a month do you pay your bank to withdraw funds from an ATM? | - |

| 1390 | Fees Per Year | $0.00 |

FIG. 13

1410 — Interest Savings

| | | |
|---|---|---|
| Checking Balance | $ | 10,000.00 |
| | Current | Bank EO |
| Checking Interest Rate | 0.00% | 0.20% |
| Differential | | 0.20% |
| Annual Savings | $ | 20.00 |

1420 — Overdraft Fees

| | | |
|---|---|---|
| # of fees per 3 months | | 1 |
| Fee amount (assumed) | $ | 35.00 |
| New Fee (assumes overdrawn $50 for 2 weeks at 11.25% APY) | $ | 0.22 |
| Annual Amount | $ | 69.57 |

1430 — Checks Deposited

| | |
|---|---|
| Checks deposited in last 3 months | 5 |

Annual Time Saved — X hours (e.g., Input x4 x15 min)

1440 — Monthly Fees

| | | |
|---|---|---|
| Fee Amount | $ | 5.00 |
| Annual Savings | $ | 60.00 |

1450 — ATM Fees

| | | |
|---|---|---|
| # of fees per month | | 0 |
| Fee amount (assumed or collected) | $ | 2.00 |
| Annual Savings | $ | - |

1460 — Customer Input

1470 — Total

| | | |
|---|---|---|
| Total Interest Savings | $ | 20.00 |
| Fee Savings | $ | 129.57 |
| Total $$ Savings | $ | 149.57 |
| Total Time Saved | | X Hours |

FIG. 14

SYSTEMS AND COMPUTER-IMPLEMENTED PROCESSES FOR ANALYZING AND DETERMINING THE VALUE OF SWITCHING ACCOUNTS

PRIORITY CLAIM

This disclosure claims priority under 35 U.S.C. § 119 to U.S. provisional patent application No. 61/691,146, filed on Aug. 20, 2012, and entitled "Systems and Computer-Implemented Processes for Analyzing and Determining the Value of Switching Accounts," which is incorporated herein by reference in its entirety.

FIELD

The disclosed embodiments generally relate to financial accounts processing systems, and more particularly, to processes and systems for analyzing aspects related to financial accounts (and other types of accounts) and enabling changes in those accounts.

BACKGROUND

Currently, financial account providers, such as banks, credit card companies, merchants, lenders, and the like, offer incentives for potential customers to switch their financial accounts from an existing provider. Lower interest rates, reduced fees, overdraft forgiveness, and premium services are some examples of incentives that financial account providers may offer to lure customers from a competing provider.

While such offers may be beneficial to a potential customer, the mechanisms used by current providers to present the incentives lack tools that enable customers to understand and appreciate the value in switching between service providers. For example, while a financial account provider may offer account switching incentives to a potential customer by advertising lower interest rates for credit accounts (or higher rates for checking accounts), the customer is required to manually compare features and benefits between their existing accounts and the offered accounts to calculate their own savings. This may require the customer to review and analyze their account statements, adding up fees paid, interest earned and time spent going to and from the branch to make deposits, in order to calculate their monetary and time savings if the customer switched accounts. While some calculators are available to assist in this assessment, they still require consumers to pore over statements to figure out what to input into the calculator in the first place.

Moreover, consumers are left in the dark concerning the degree of difficulty and complexity involved in switching accounts. No processes exist that give transparency to the switching process based on a customer's unique situation (e.g. how many direct deposits they have, how many bill payees they have set up in their previous account and how many bills are automatically debited from their account) and rate the degree of difficulty so customers expectations are set if deciding to switch.

Thus, existing mechanisms are cumbersome, slow, and lack user-friendly feedback that enable a customer to quickly appreciate the benefits of switching a financial account to a new provider offering switching incentives.

SUMMARY

Disclosed embodiments include systems and processes that enable a customer to estimate the benefits gained in switching from an existing service provider, such as a service provider providing certain financial services to the customer, to a different service provider soliciting the switch. The disclosed embodiments include mechanisms that assist in gathering information regarding transactions that need to be changed based on switching accounts (e.g., financial, membership, rewards, travel, etc.) and provide transparency into the switch process so that the customer can manage the switch to avoid unnecessary fees, the risk of overdrafts, and the like. Further, certain embodiments provide mechanisms that configure and perform the switching of accounts for the customer. Accordingly, some embodiments provide a system and process that provides automated and user-friendly mechanisms, enabling customers to estimate the savings gained from switching to a new financial account provider.

The disclosed embodiments include a customer account switching valuation computer system including a storage device storing instructions and a processor configured to execute the instructions in the storage device. In one aspect, the processor may receive, from a client computer associated with a customer, a response to an offer to switch an existing account to a new account, and collect, based on the response, account information relating to the existing account. The processor may also parse the collected account information into one or more categories and analyze the categorized account information to determine a value to the customer for switching from the existing account to the new account. The processor may also provide a representation of the value to the client computer.

The disclosed embodiments also include a customer account switching valuation method. In one aspect, the method may include receiving, from a client computer associated with a customer, a response to an offer to switch an existing account to a new account and collecting, based on the response, account information relating to the existing account. The method may also include parsing, via a processor, the collected account information into one or more categories and analyzing, via the processor, the categorized account information to determine a value to the customer for switching from the existing account to the new account. The method may also include providing a representation of the value to the client computer.

The disclosed embodiments may also include a client device including a storage device storing instructions and a processor configured to execute the instructions in the storage device. In one aspect, the processor may receive, from a remote computer, an offer to switch an existing account provided by a first account provider to a new account provided by a second account provider. The processor may also provide a response to the offer to the remote computer, and receive from the remote computer a representation including a value to the customer for switching from the existing account to the new account.

Consistent with other disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 7 is an exemplary user-interface for collecting customer account information that may be provided by the disclosed embodiments.

FIG. 11B is an exemplary user-interface for providing information reflecting how the account switch analysis results were determined that may be provided by the disclosed embodiments.

FIG. 13 shows exemplary request fields that may be provided in a user-interface for collecting customer account information that may be implemented by the disclosed embodiments.

FIG. 14 shows exemplary switch analysis logic for determining the account switch analysis results that may be implemented by the disclosed embodiments.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
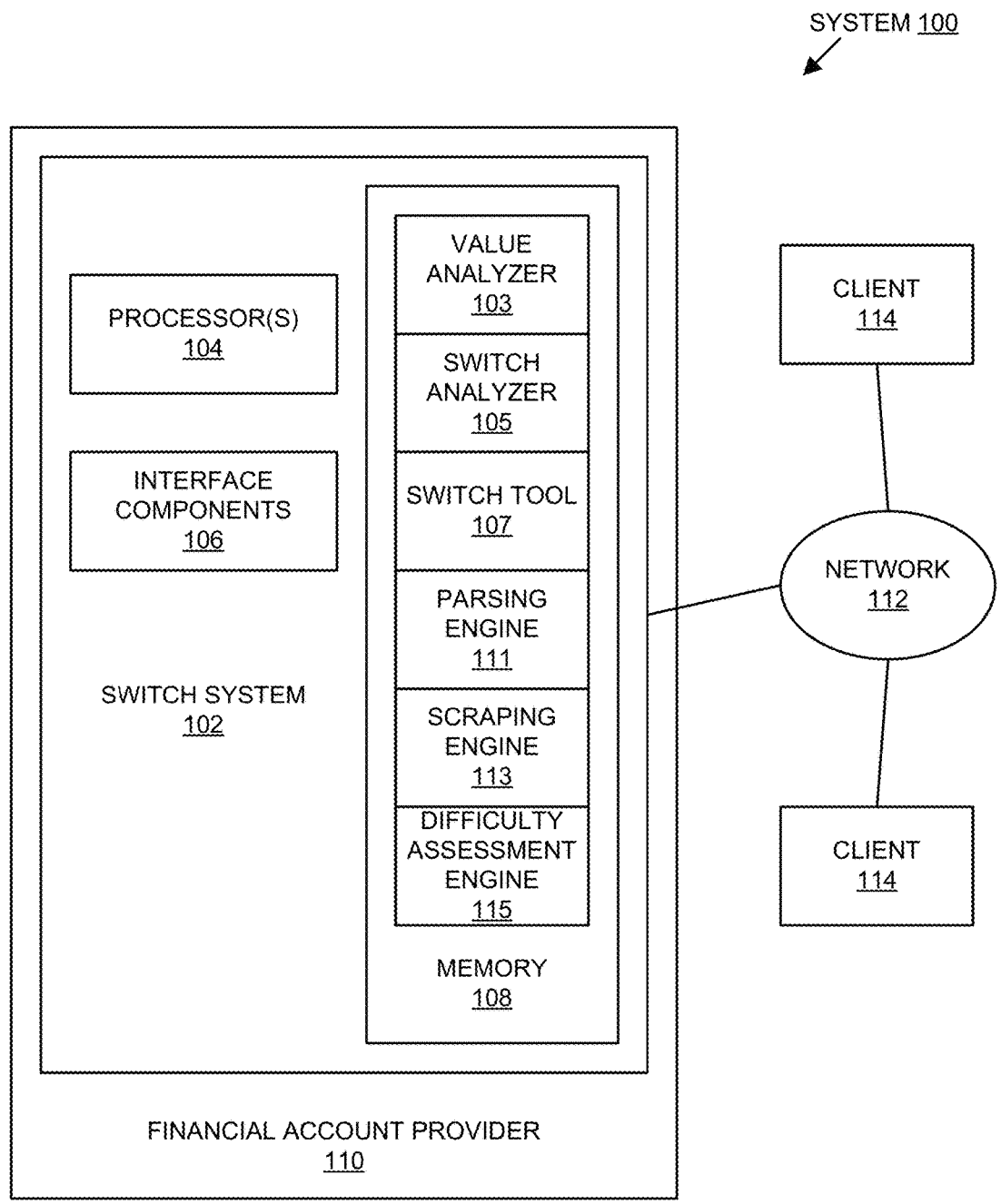
FIG. 1 is diagram of an exemplary system that may be used to implement the disclosed embodiments.

FIG. 1 shows an exemplary system that is configured to perform one or more software processes that, when executed, provide one or more aspects of the disclosed embodiments. The components and arrangement shown in FIG. 1 is not intended to be limiting to the disclosed embodiment as the components used to implement the processes and features disclosed here may vary.

In accordance with certain disclosed embodiments, a system 100 may be provided that includes a switch system 102, network 112, and one or more clients 114. Other components known to one of ordinary skill in the art may be included in system 100 to process, transmit, provide, and receive information consistent with the disclosed embodiments.

Switch system 102 may be a computer-based system including computer system components, such as one or more servers, desktop computers, workstations, tablets, hand held computing devices, memory devices, and/or internal network(s) connecting the components. In one embodiment, switch system 102 may be a server that includes one or more processor(s) 104, memory devices, such as memory 108, and interface components 106. Switch system 102 may be a single server or may be configured as a distributed computer system including multiple servers or computers that interoperate to perform one or more of the processes and functionalities associated with the disclosed embodiments. In certain embodiments, switch system 102 may be a server that is associated with a financial account provider 110, such as, for example, a bank, lender, merchant, credit card provider, and any other entity that provides financial accounts to customers. Financial accounts may include, for example, credit card accounts, checking accounts, savings accounts, loans, investment accounts, and any other type of account relating to financial products. In one aspect, financial account provider 110 may be a provider that advertises, solicits, or otherwise communicates with potential customers for switching the customers' existing financial accounts to financial accounts provided by financial account provider 110.

Processor(s) 104 may be one or more known processing devices, such as a microprocessor from the Pentium™ family manufactured by Intel™ or the Turion™ family manufactured by AMD™. Processor(s) 104 may include a single core or multiple core processor system that provides the ability to perform parallel processes simultaneously. For example, processor 104 may be a single core processor that is configured with virtual processing technologies known to those skilled in the art. In certain embodiments, processor 104 may use logical processors to simultaneously execute and control multiple processes. Processor 104 may implement virtual machine technologies, or other similar known technologies to provide the ability to execute, control, run, manipulate, store, etc. multiple software processes, applications, programs, etc. In another embodiment, processor(s) 104 may include a multiple-core processor arrangement (e.g., dual or quad core) that is configured to provide parallel processing functionalities to allow switch system 102 to execute multiple processes simultaneously. One of ordinary skill in the art would understand that other types of processor arrangements could be implemented that provide for the capabilities disclosed herein.

Switch system 102 may include one or more storage devices configured to store information used by processor 104 (or other components) to perform certain functions related to the disclosed embodiments. In one example, switch system 102 may include a memory 108 that includes instructions to enable processor(s) 104 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, nonremovable, or other type of storage device or tangible computer-readable medium.

In one embodiment, switch system 102 includes a memory 108 that includes instructions that, when executed by processor(s) 104, perform one or more processes consistent with the functionalities disclosed herein. Methods, systems, and articles of manufacture consistent with disclosed embodiments are not limited to separate programs or computers configured to perform dedicated tasks. For example, switch system 102 may include a memory that may include one or more programs to perform one or more functions of the multiple user display control features of the disclosed embodiments. Moreover, processor(s) 104 may execute one or more programs located remotely from system 100. For example, system 100 may access one or more remote programs, that, when executed, perform functions related to disclosed embodiments. Memory 108 may include one or more memory devices that store data and instructions used to perform one or more features of the disclosed embodiments. Memory 108 may also include any combination of one or more databases controlled by memory controller devices (e.g., server(s), etc.) or software., such as document management systems, Microsoft SQL databases, SharePoint databases, Oracle™ databases, Sybase™ databases, or other relational databases.

Switch system 102 may also be communicatively connected to one or more memory devices (e.g., databases (not shown)) locally or through a network. The remote memory devices may be configured to store information and may be accessed and/or managed by switch system 102. By way of example, the remote memory devices may be document management systems, Microsoft SQL database. SharePoint databases, Oracle™ databases, Sybase™ databases, or other relational databases. Systems and methods of disclosed embodiments, however, are not limited to separate databases or even to the use of a database.

Switch system 102 may also include one or more I/O devices that may comprise one or more interfaces for receiving signals or input from input devices and providing signals or output to one or more output devices that allow data to be received and/or transmitted by switch system 102. For example, switch system 102 may include interface components 106 that may provide interfaces to one or more input devices, such as one or more keyboards, mouse devices, and the like, that enable switch system 102 to receive data from one or more users (such as clients 114). Further, interface components 106 may include components configured to send and receive information between components of switch system 102 or external to switch system 102, such as network 112.

Network 112 may be any type of network that provides communications, exchanges information, and/or facilitates the exchange of information between switch system 102 and clients 114. In one embodiment, network 112 may be the Internet, a Local Area Network, or other suitable connection (s) that enables system 100 to send and receive information between the components of system 100.

Client 114 may each be one or more computer systems. For example, client 114 may include a general purpose or notebook computer, a mobile device with computing ability, a server, a desktop computer, tablet, or any combination of these computers and/or affiliated components. In one embodiment, each client may be a computer system or device that is operated by a user who is a customer or a potential customer of a financial service provider. Client 114 may be configured with storage that stores one or more operating systems that perform known operating system functions when executed by one or more processors. By way of example, the operating systems may include Microsoft Windows™, Unix™, Linux™, Apple™ Computers type operating systems, Personal Digital Assistant (PDA) type operating systems, such as Microsoft CE™, or other types of operating systems. Accordingly, embodiments of the disclosed invention will operate and function with computer systems running any type of operating system. Client 114 may also include communication software that, when executed by a processor, provides communications with network 112, such as Web browser software, tablet or smart hand held device networking software, etc. Client 114 may be a device that executes mobile applications, such as a tablet or mobile device.

In certain embodiments, memory 108 may include software components that, when executed by processor(s) 104, perform one or more processes consistent with the disclosed embodiments. For example, memory 108 may include a value analyzer 103, switch analyzer 105, and switch tool 107, which include software instructions executable by one or more processors, such as processor(s) 104, alone or in various combinations. When executed, value analyzer 103, switch analyzer 105, and/or switch tool 107 may provide features relating to switching financial accounts consistent with the disclosed embodiments. In certain embodiments, value analyzer 103 performs functions that provide an online automated account comparison tool that determines and presents savings to customers if the customers switched existing financial accounts to financial accounts provided by the financial account provider 110. Switch analyzer 105 may be configured to perform functions that provide information displayed to customers over network 112. Such information may identify and explain one or more transactions that need to be switched to the new financial account offered by financial account provider 110 when the customers make the account switch. Switch analyzer 105 may also be configured to provide an automated system for customers to schedule account switches and learn of updated schedule information as the switch tool 107 performs switching processes. The logic implemented would assess the optimal schedule for minimizing the risk of incurring fees from non-sufficient funds or late bill payment. Switch tool 107 may be configured to provide tools that are used by customers over network 112 to switch activities from their previous account to the new financial account offered by financial account provider 110, such as automatic bill pay features and third-party initiated activities (e.g., direct deposits, ACH debits, ACH credits, etc.).

Memory 108 may also include other software processes that, when executed by processor(s) 104, perform processes consistent with the disclosed embodiments. For example, memory 108 may also include parsing engine 111 that performs parsing processes that collect and categorize raw and unformatted account data for a customer's existing account. Parsing engine 111 may be part of value analyzer 103 or may be software that is accessed and used by value analyzer 103. Memory 108 may also include scraping engine 113, which may be software that, when executed by processor(s) 104, perform seek and collect account data for a customer's existing account, such as from the customer's existing account provider's computer systems. Scraping engine 113 may be part of value analyzer 103 or may be software that is accessed and used by value analyzer 103. Memory 108 may also include a difficulty assessment engine 115, which is software that, when executed by processor(s) 104, performs difficulty assessment processes that determine the level of difficulty for performing the switch to the new account (e.g., overall difficulty, certain transaction switching difficulty (e.g., bill pay, direct deposit, ACH, etc.). Difficulty assessment engine 113 may be part of value analyzer 103, switch analyzer, and/or switch tool 107, or may be software that is accessed and used by these software components.

Figure 2:
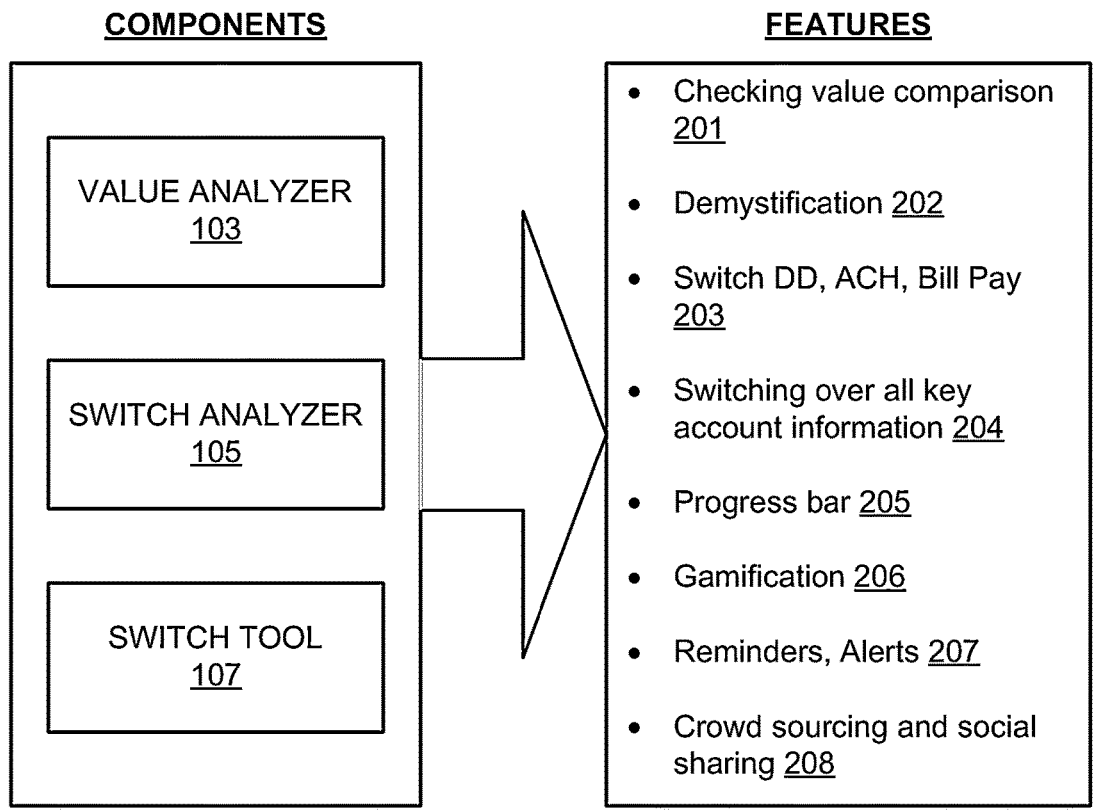
FIG. 2 is a diagram of switch component features that may be provided by the disclosed embodiments.

For example, FIG. 2 illustrates some of the processes performed by value analyzer 103, switch analyzer 105, and/or switch tool 107. The disclosed embodiments may perform a checking value comparison process 201 that may be executed by a processor to gather and compare account parameters between a customer's existing account and a new account provided by a financial account provider, in order to determine values that may be quantified and presented to the customer (e.g., monetary and temporal savings to the customer).

The disclosed embodiments may also perform a demystification process 202 to determine what account transactions need to be switched and configured for a new account, and to generate information that is provided to the customer showing what transactions need to be switched, how those transactions can be switched, the progress of the switching of the transactions, and details relating to those transactions. The dymystification process 202 may also determine an estimate of how much time is necessary to conduct the switch using data from customers who previously used the switching processes of the disclosed embodiments.

Switch DD (Direct Deposit), ACH, and Bill Pay processes 203 may be executed by a processor to automatically and/or with user input or involvement, configure direct deposit, ACH transactions, bill pay activities, and other types of financial-related activities.

Switching overall key account information 204 is a process that may be executed by a processor to transfer, switch, and/or upload account information to the new financial account provided by financial account provider 110. For example, account preferences (e.g., starting web page when logging in, paperless statements, etc), Alerts (e.g., e-mail, text, phone, etc.), and store Account History from the previous financial account provider (e.g., statements, text files of transactions, etc).

Progress bar 205 is a process that may be executed by a processor to determine, monitor, and analyze the progress of a switch facilitated by switch system 102 and generate information for display in a user-interface for presenting the progress of the switch, including, for example, a progress bar that is displayed on a user-interface. Other types of content may be implemented to reflect the progress of the switch processes, such as text, graphics, color codes, charts, percentage representations, etc.

Gamification 206 is a process that may be performed to determine and generate incentives (both virtual or real) for rewarding a customer for performing a switching-related activity such as opening a new account through the disclosed embodiments, including for example reward points, interest rate adjustments, fee forgiveness, monetary credits, badges for an online profile or other virtual rewards deemed valuable, etc. Real and virtual rewards may also be given for sharing the switching experience on social networks and recommending it to other entities or users (e.g., friends, business partners, etc.).

Reminders and Alerts 207 is a process that may be executed by a processor to determine events that should take place relating to the new financial account and determine whether certain events or issues occur that need to be addressed, and to generate appropriate alert information for display in a user-interface, communication, or the like to alert a customer of such events or issues. For example reminders and alerts may be generated when certain stages of the switching process have been completed or when attention is needed on certain switching processes in order for a switch to be completed. Additionally reminders and alerts may be generated around gamification elements (e.g., representations of virtual or real incentives) to encourage customers to take advantage of incentives or to let customers know when they have triggered an incentive.

Crowd sourcing and social sharing 208 is a process that may be performed to provide mechanisms that allow the customer to share their experiences relating to switching accounts via the disclosed embodiments with other individuals or entities via social networking sites. This process may be performed to collect and analyze a customer's demographics against other customer demographic information to determine and provide statistical information regarding characteristics of the customer's switch process and experience. For example, disclosed embodiments may perform processes that determine statistics of demographically similar customers to provide information to a new customer reflecting how much money similarly situated people have saved, or how long it took similarly situated people to complete an account switch using the disclosed embodiments, etc.

Figure 3:
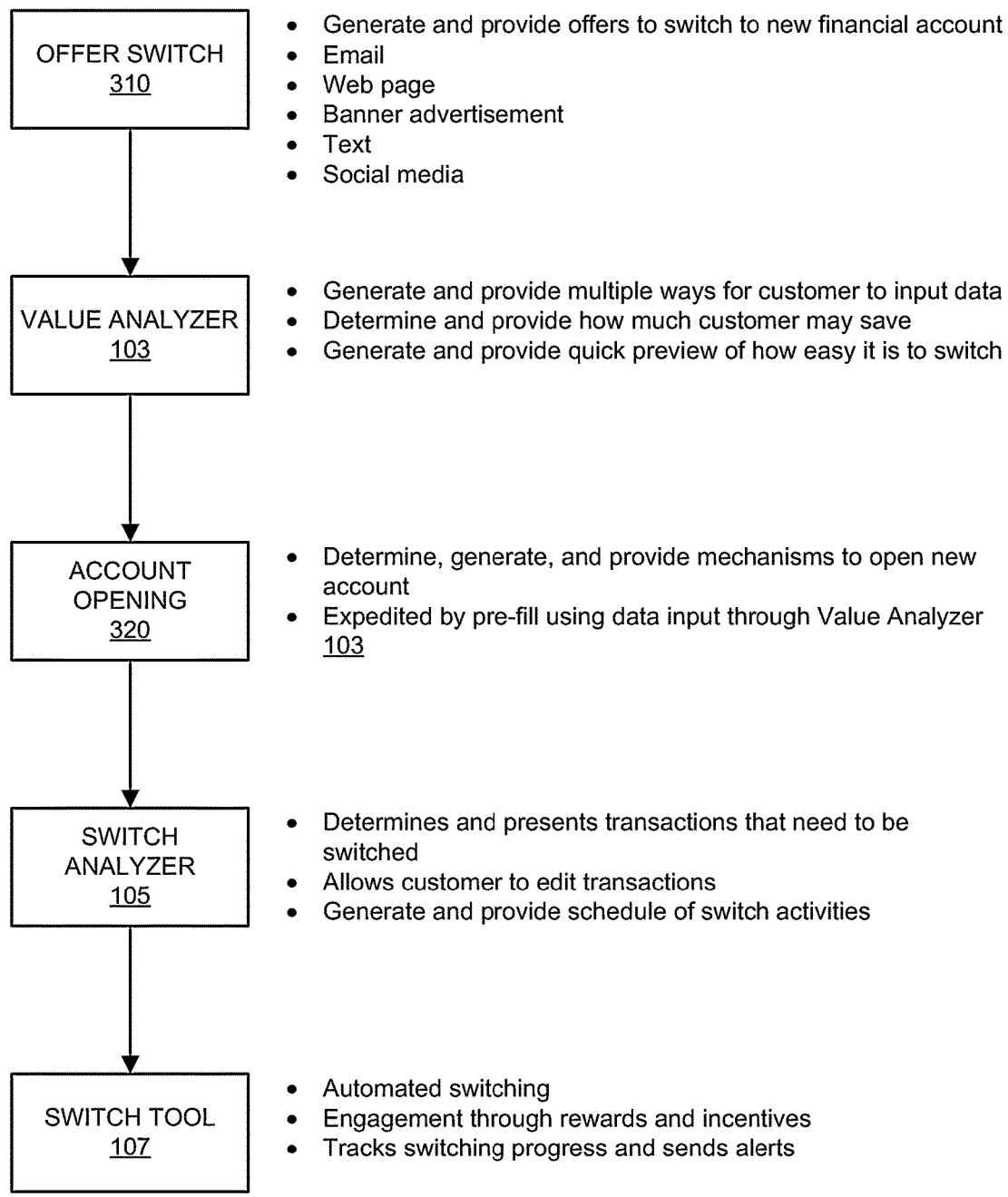
FIG. 3 is an exemplary switch process flow consistent with the disclosed embodiments.
Figure 4:
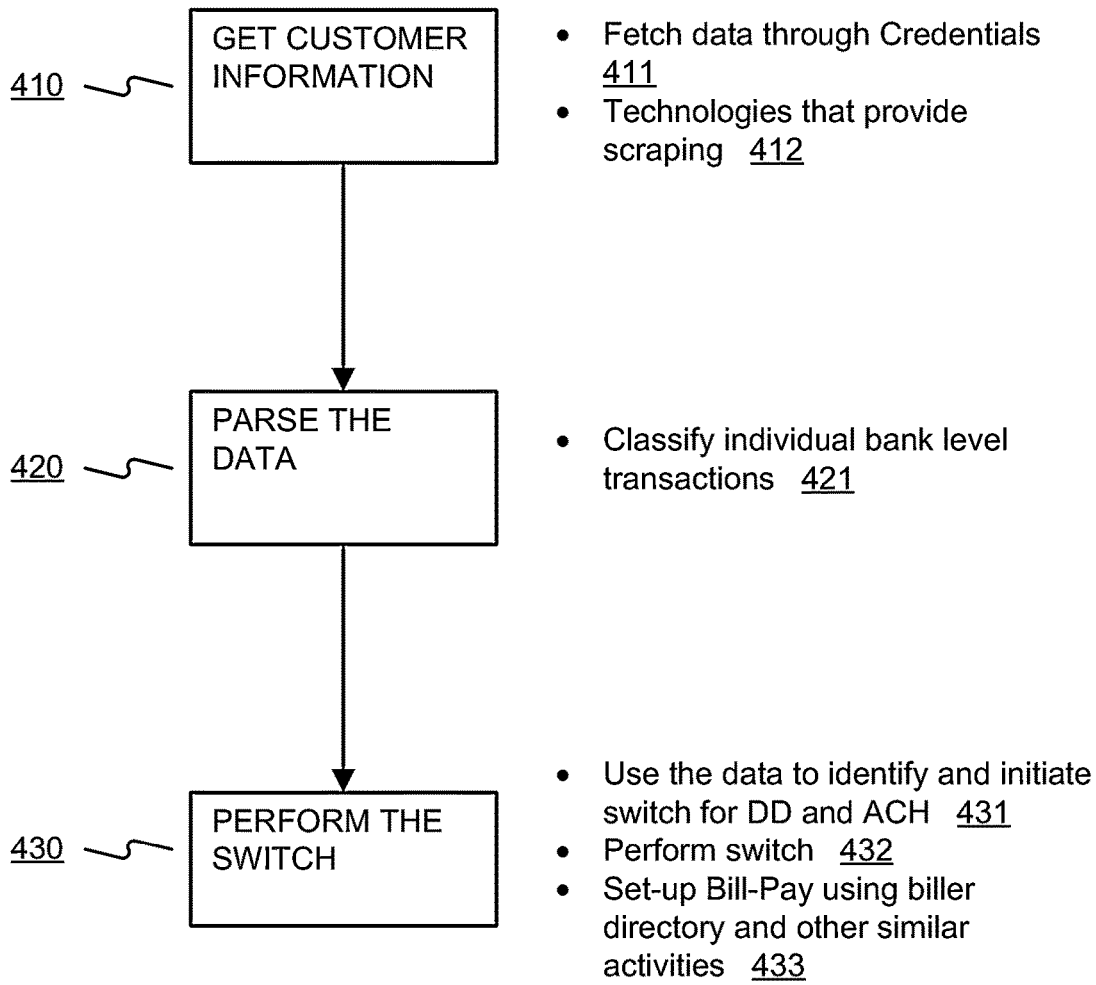
FIG. 4 is another exemplary switch process flow consistent with the disclosed embodiments.

Aspects of the disclosed embodiments provide an online switch process that is automated and user-controlled with user-friendly features. FIG. 3 illustrates a general overview of an exemplary switch process that may be performed by certain disclosed embodiments. FIG. 4 shows a higher level representation of switch processes consistent with the disclosed embodiments. In one embodiment, switch processes may include collecting customer information (see.g., FIG. 4, 410) through, for example, fetching data using a customer's provided credentials (see.g., FIG. 4, 411) or technologies that provide account scraping, e.g., collecting information about a customer's existing account (see.g., FIG. 4, 412). The switch processes may also include parsing the collected data (see.g., FIG. 4, 420). For example, in one embodiment, parsing software, when executed by one or more processors, may take customer account data in a raw, unclassified format as it exists or is collected from the customer's existing account provider. For example, a customer's account statement may be provided in an unclassified and raw format, or the electronic data representing the customer's existing account may be formatted in raw text file format. The parsing process may convert the raw data into categories that are used to perform the value and switch analysis of the disclosed embodiments (e.g., FIG. 4, 421). In certain embodiments, the parsing process may convert the collect account data into the following categories for use by value analyzer 103:

Interest Paid
Monthly cycle/account fee
Overdraft Fee (original/first)
Overdraft Fee (subsequent/pile-on)
ATM Withdrawal Fee (ATM owner)
ATM Withdrawal Fee (Bank)
Number of frequency of deposits made at Bank Teller or ATM In other embodiments, the parsing process may also convert the collected account information into the following categories for use by switch Analyzer 105:

Direct Deposit information
Bill pay information
Auto ACH Debit payment (biller) information
ACH Credit (e.g. annuity or investment income) information
Auto Debit Card payment information Transfers to other bank accounts (internal & external) information The switching processes may also perform switch processes that execute and perform the switching of the accounts and any transactions relating to the new account (e.g., FIG. 4, 430). For example, aspects of the disclosed embodiments may use the parsed data generated by the parsing process to identify and initiate switches for transactions, e.g., direct deposits, ACH transactions, bill pay transactions, etc. (e.g., FIG. 4, 431), open the new account, perform the switch to the new account (e.g., FIG. 4, 432), and set up bill pay transactions using, for example, a biller directory (e.g., FIG. 4, 433).

In one embodiment, financial account provider 110 may implement a computer system that executes software to generate and provide offers to switch to a new financial account offered by financial account provider 110. Switch system 102 may be configured with software that, when executed by processor(s) 104, identify potential customers, generate offers (e.g., solicitations, advertisements, direct marketing communications, etc.) and provides the offers to the customer(s) through one or more channels of communication. In one embodiment, financial account provider 110 may implement another server or computer system to perform such functions. Examples of such offering functions includes generating and providing offers to switch accounts through Web site advertisements, direct communications to customers (emails, text messages, social media communications), and any other type of marketing efforts using the technologies known to one of ordinary skill in the art (e.g., FIG. 3, 310).

Figure 5A:
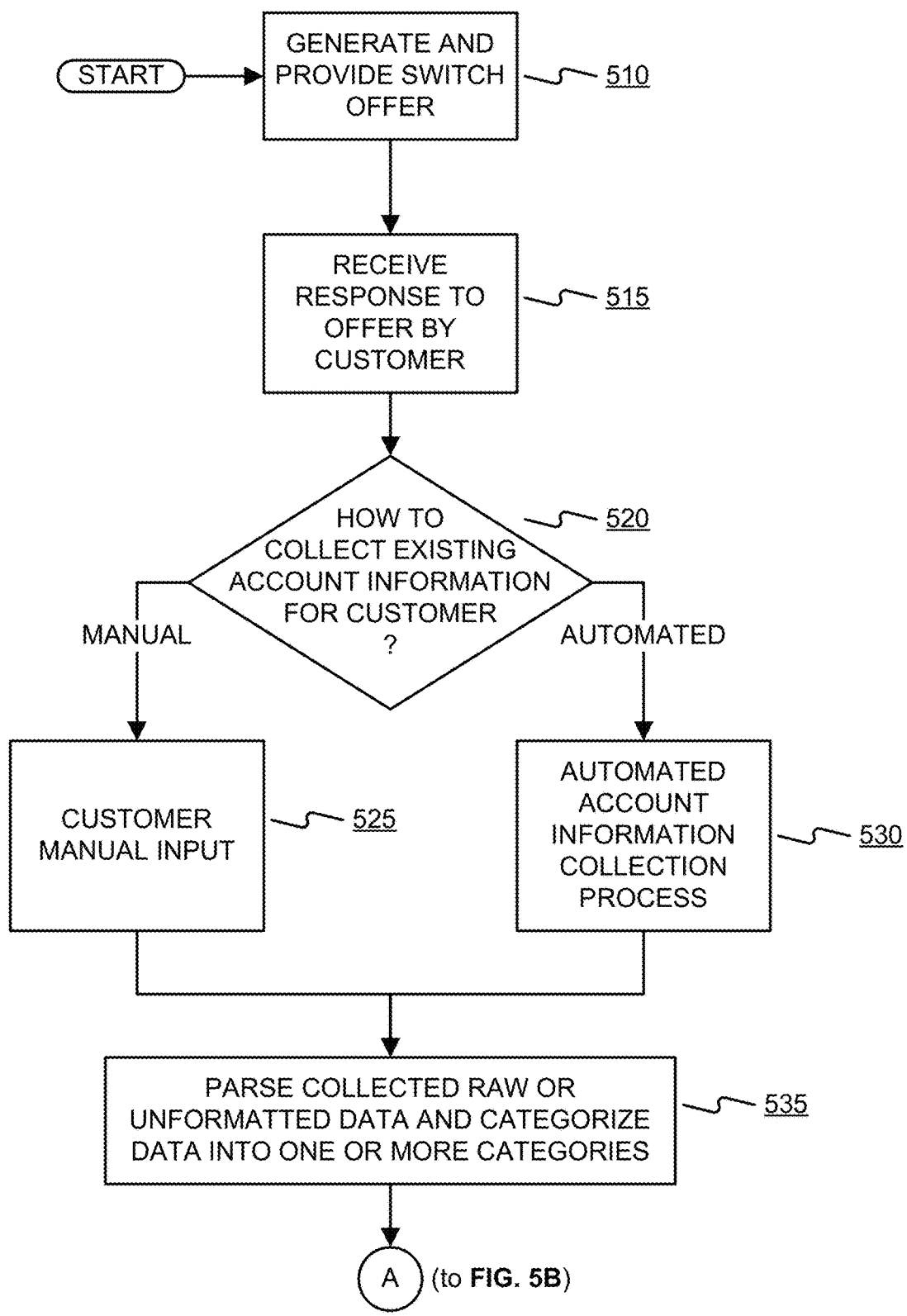
FIGS. 5A-C depict a flowchart of an exemplary switch process consistent with the disclosed embodiments.
Figure 5B:
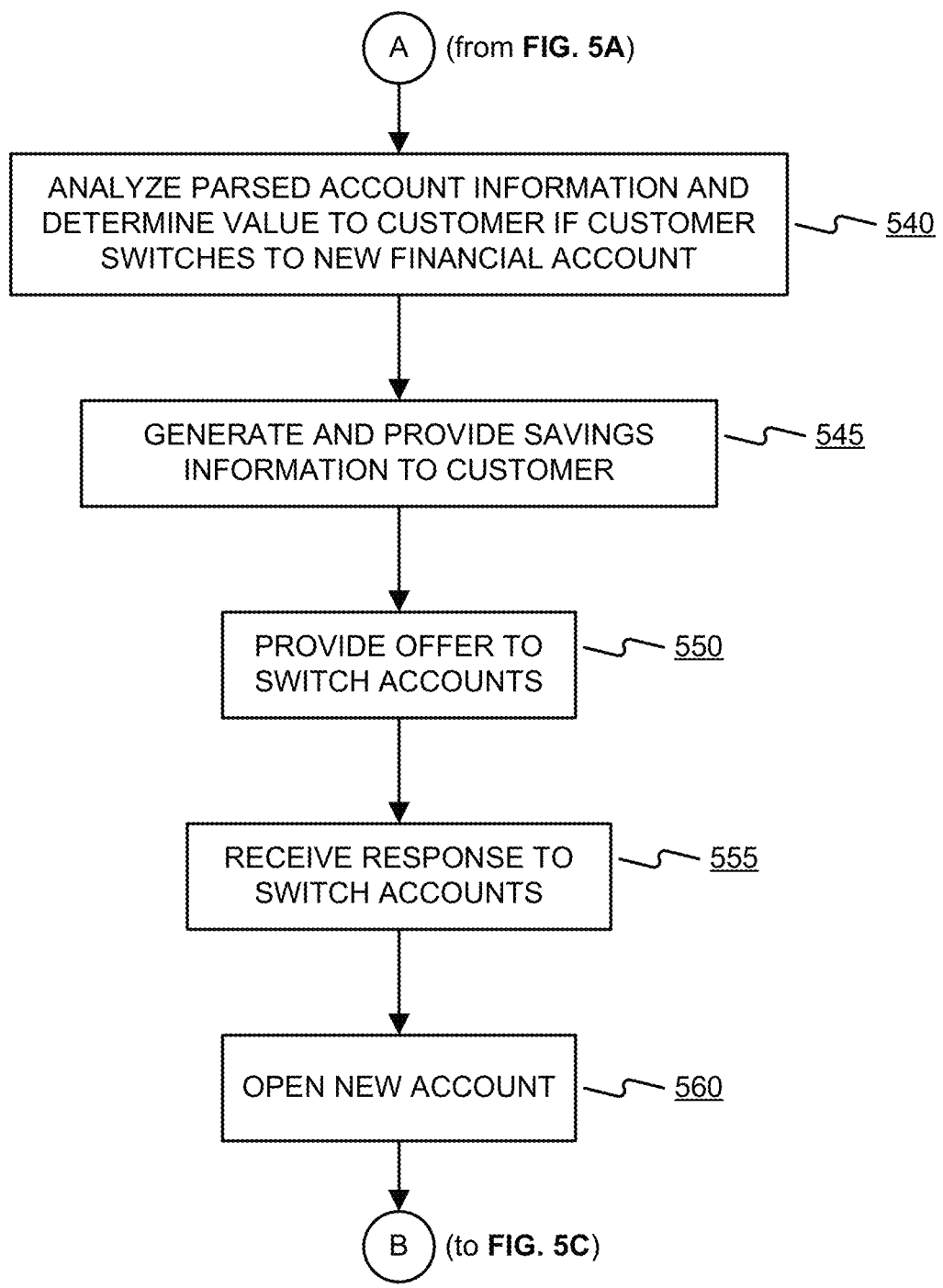
Figure 5C:
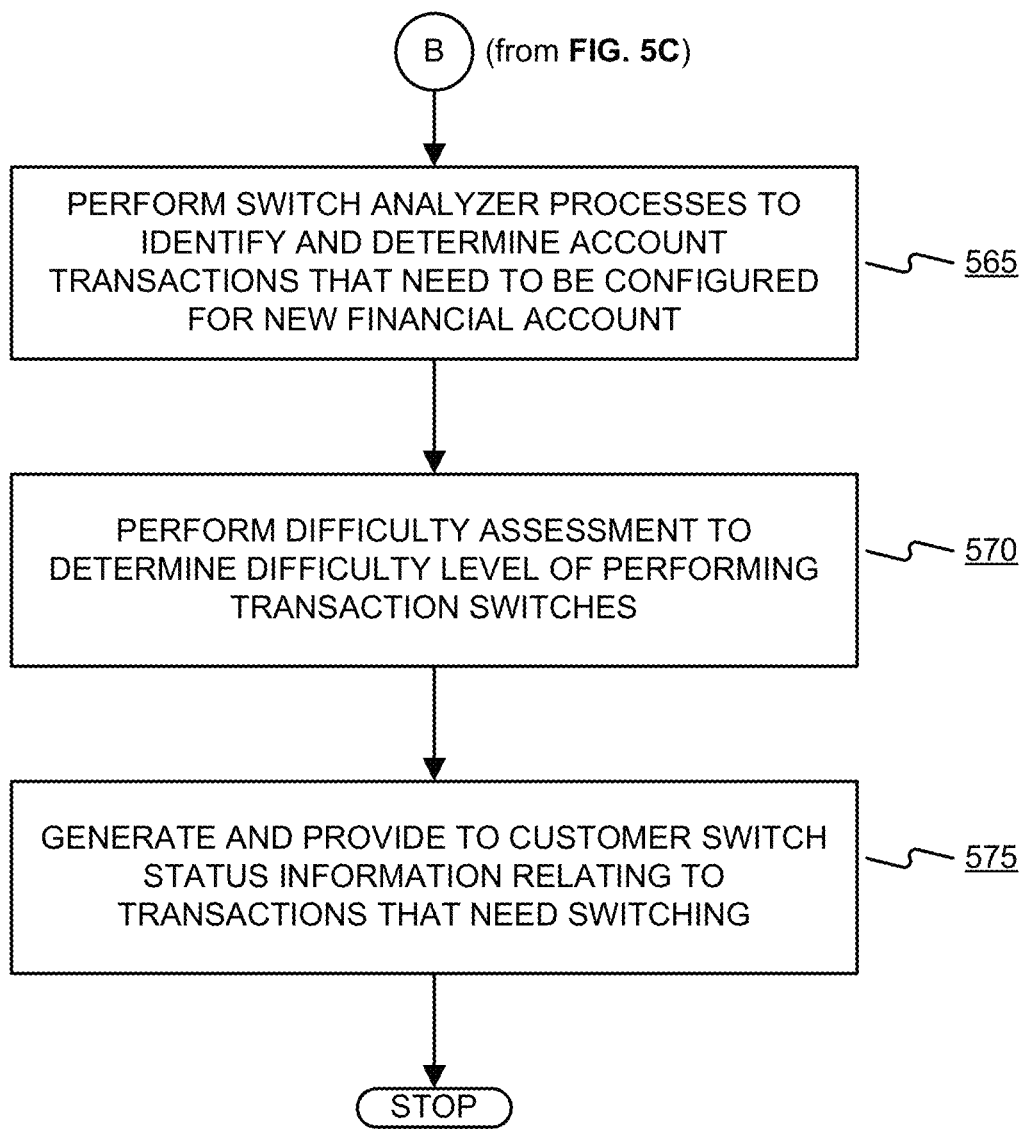

FIGS. 5A-C depict a flowchart of an exemplary switch process that may be performed by switch system 102 consistent with certain embodiments. With reference to FIG. 5A, initially, the disclosed embodiments may generate and provide a switch offer (e.g., 510). The switch offer may be provided directly to one or more customers or may be presented as part of a Web page or similar wide-based distribution channel that solicits a response from a potential customer of financial account provider 110. The switch offer may be provided to client 114 that executes software processes that processes the communication with the offer to render the offer on a display device for viewing by the customer.

Figure 6:
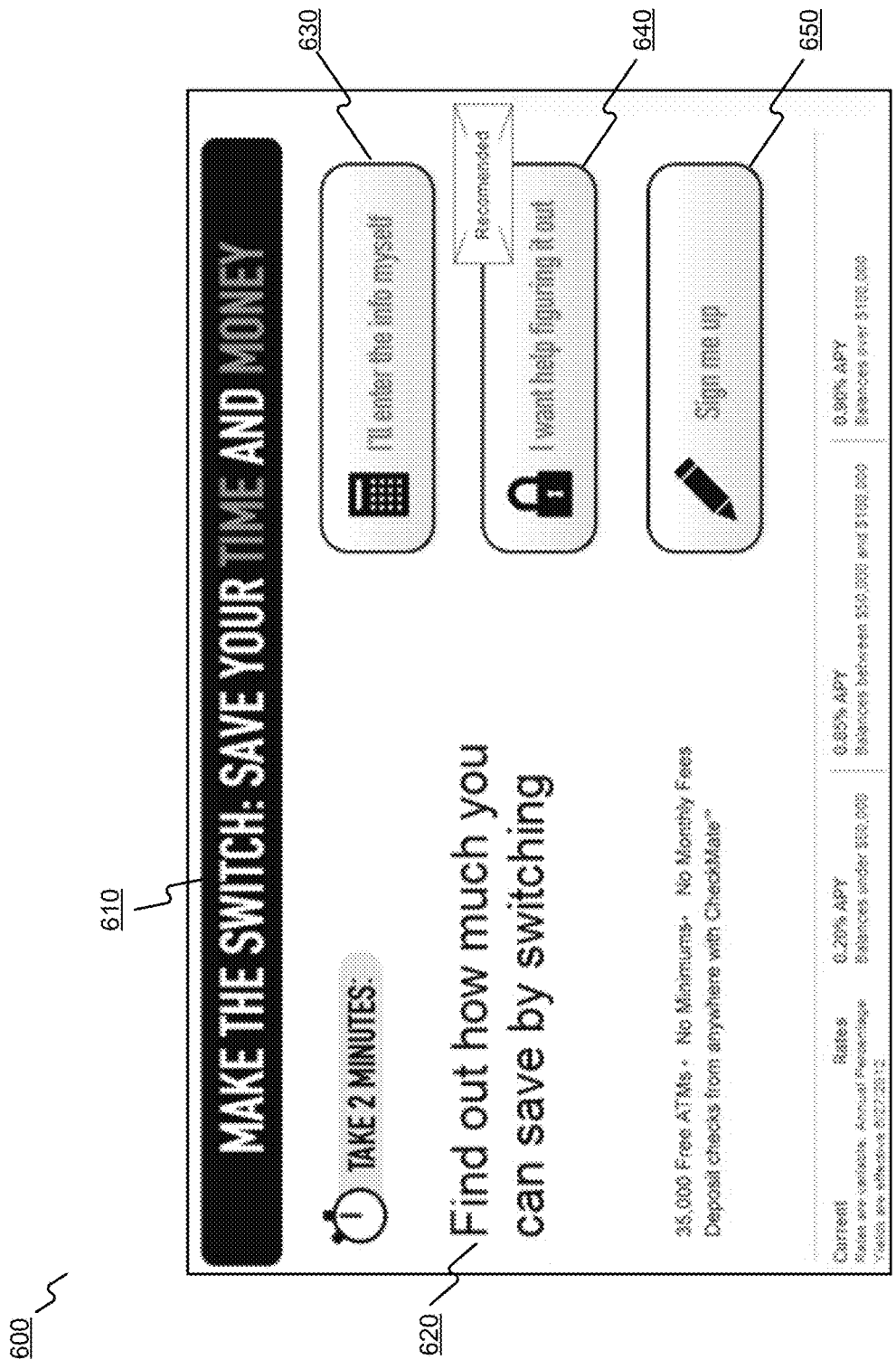
FIG. 6 is an exemplary user-interface for requesting user-based switch process initiation that may be provided by the disclosed embodiments.

FIG. 6 shows an exemplary user-interface 600 that may be provided by switch system 102 or other system(s) associated with financial account provider 110. The user-interface 600 of FIG. 6 may be displayed in a display device included in client 114. As shown in FIG. 6, the exemplary user-interface includes options for a customer to enter account information themselves (630) or allow the switch system 102 to collect account information relating to the customer's existing account at another financial account provider (640). User-interface 600 may also include a request for a user to sign-up for the switch features offered by the disclosed embodiments (650). The customer may select one of the options and client 114 may provide the response back to switch system 102 over network 112.

Figure 7:
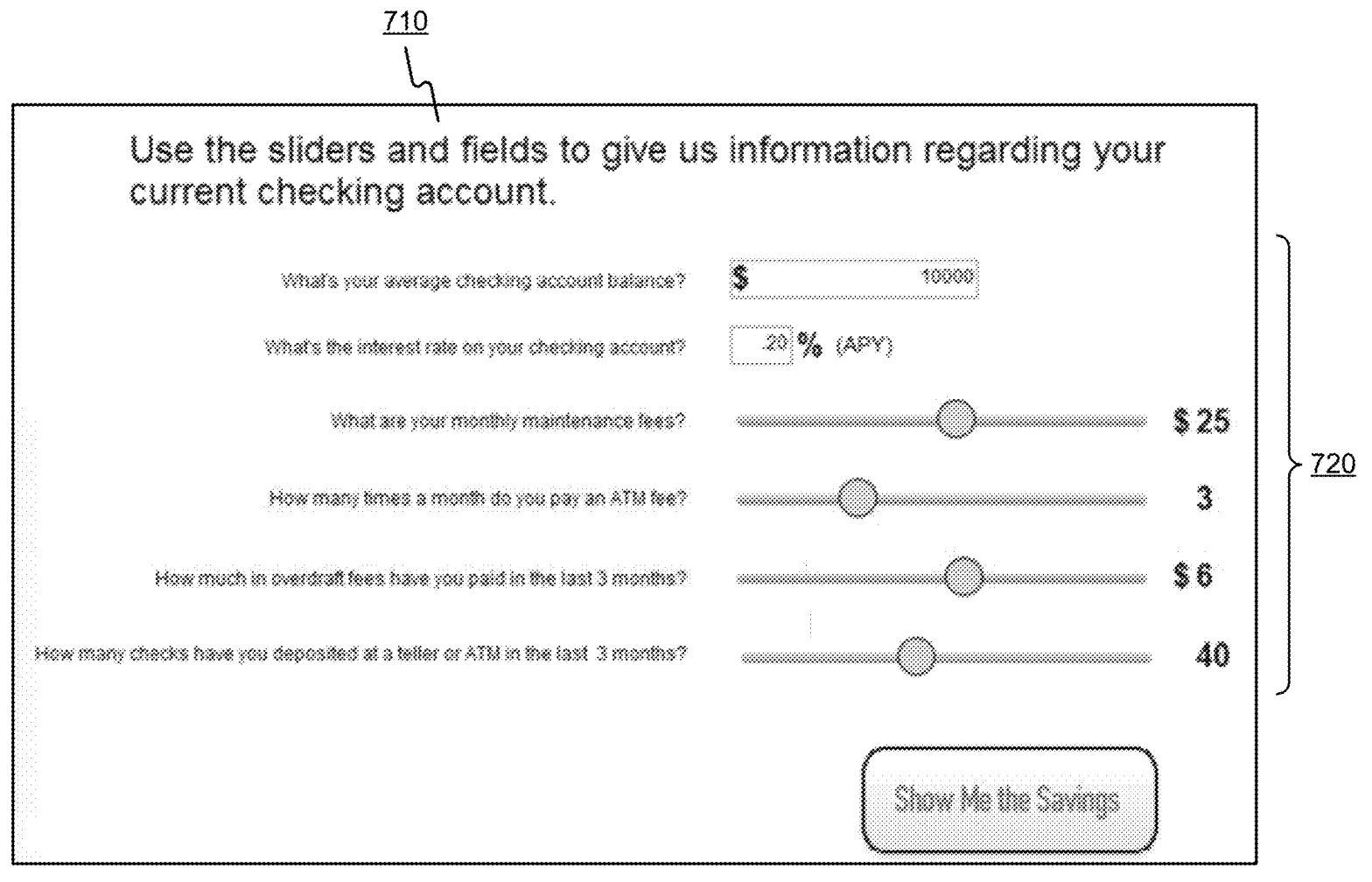

Returning to FIG. 5A, switch system 102 may receive the response by the customer (515) and execute the value analyzer 105 to determine whether to collect existing account information through manual collection or automated account information collection processes (520). Based on the customer's selection, value analyzer 105 may perform one or more processes that allow the user to manually input account information (525) or provide document(s) or information (e.g., log-in credentials) that can be used by value analyzer 105 to collect the account information (530). For example, FIG. 7 shows an exemplary user-interface 700 including textboxes, sliders, and buttons (e.g., 720) that may be generated by switch system 102 to allow a customer to provide existing account information manually. Other mechanisms may be implemented to allow a user to provide existing account information to switch system 102 without departing from the scope of the disclosed embodiments. Also, other types of account solicitations may be provided and implemented. Aspects of the disclosed embodiments include software processes that, when executed by processor(s) 104, generate and provide the content, questions, solicitations, etc. included in the user-interface provided to the customer to gather existing account information. For example, value analyzer 103 may include software that, when executed by processor(s) 104, generates questions that are included in a document provided over network 112 to client 114.

Figure 8:
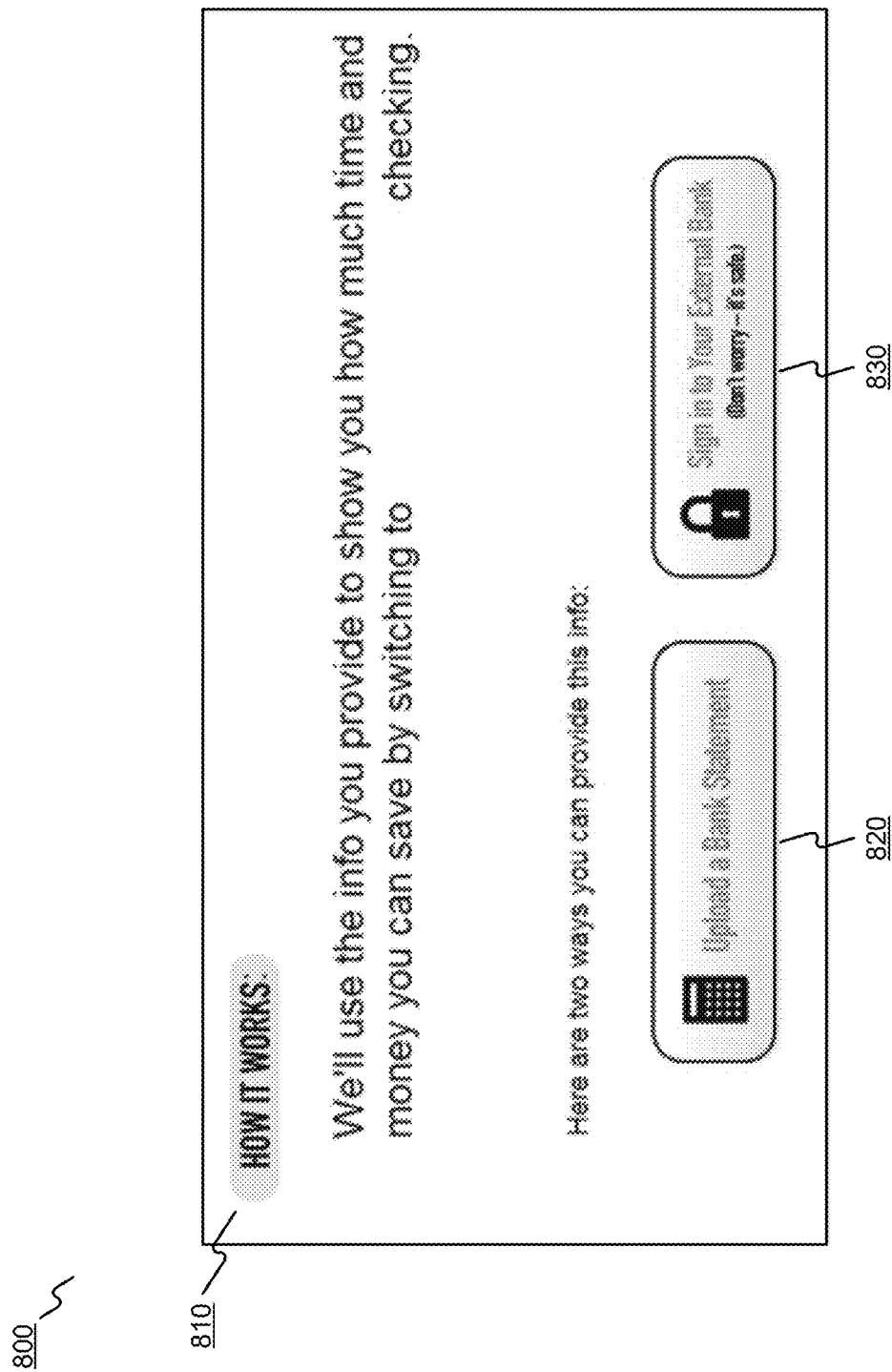
FIG. 8 is an exemplary user-interface for collecting customer account information that may be provided by the disclosed embodiments.

FIG. 8 shows an exemplary user-interface 800 that may be generated to provide existing account information through automated mechanisms. For example, in one embodiment, switch system 102 may provide a solicitation 810 to client 114 that is displayed to a customer that requests the customer to choose whether to upload a bank statement for their existing financial account (820) or to allow switch system 102 to gain access to the existing account over the Internet to collect the account information (830). In certain embodiments, switch system 102 may allow customers to upload an image (e.g., digital photograph, etc.) that includes the customer's existing account information or other financial information (e.g., an image of a payment stub or an investment account statement).

Figure 9:
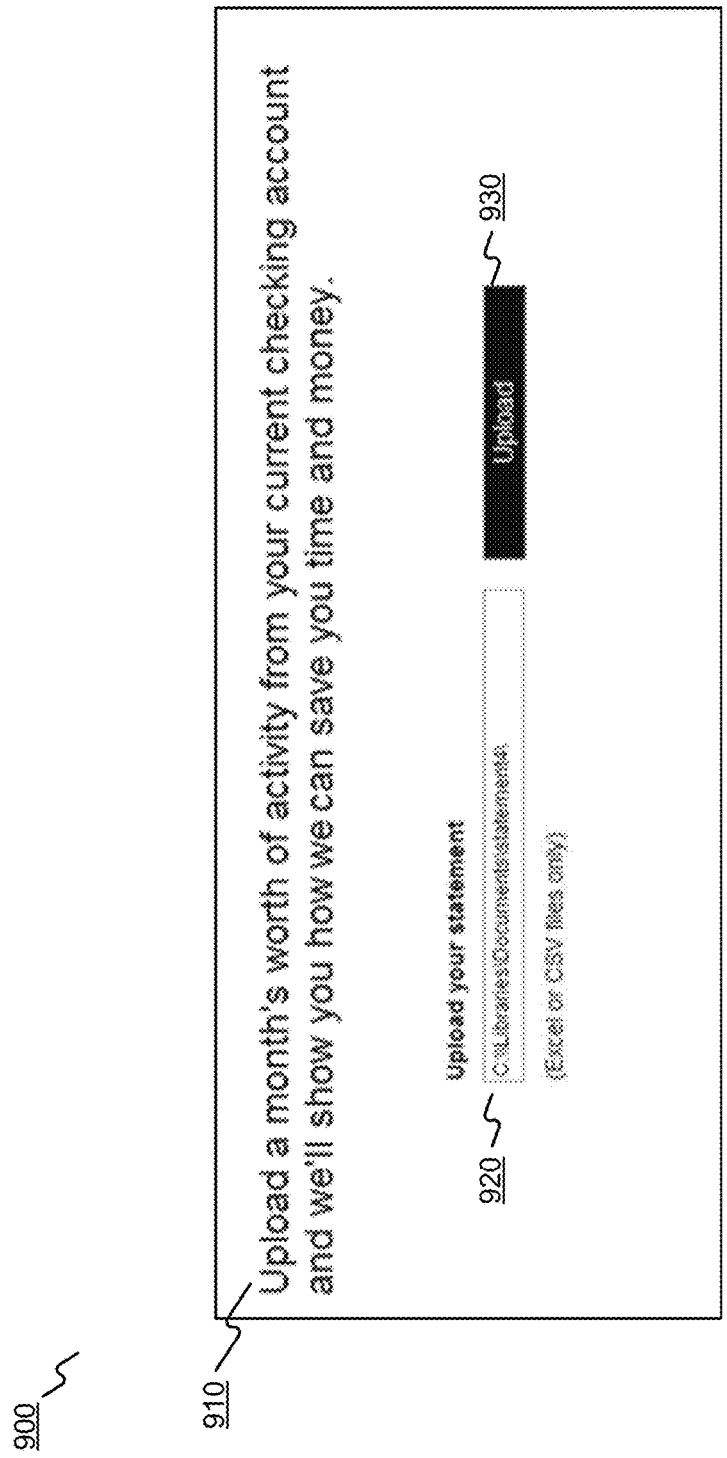
FIG. 9 is an exemplary user-interface for uploading account documents containing customer account information that may be provided by the disclosed embodiments.

FIG. 9 shows an exemplary user-interface 900 that may be generated to allow a customer to upload an existing bank statement to switch system 102. Aspects of the disclosed embodiments include software processes that, when executed by processor(s) 104, generate and provide the content, questions, solicitations, etc. included in the user-interface provided to the customer to upload, receive, and process the bank statement (910). Aspects of the disclosed embodiments may allow the customer to upload the bank statement document in any suitable electronic format, including, for example, PDF, spreadsheet or text file format (e.g., FIG. 9, 920-930). The user-interface of FIG. 9 is exemplary and not limiting to the aspects of the disclosed embodiments. Other formats, types of content, queries, mechanisms for uploading, etc. can be implemented for allowing switch system 102 to receive and process one or more bank statements (or similar documentation or information) from client 114.

Figure 10:
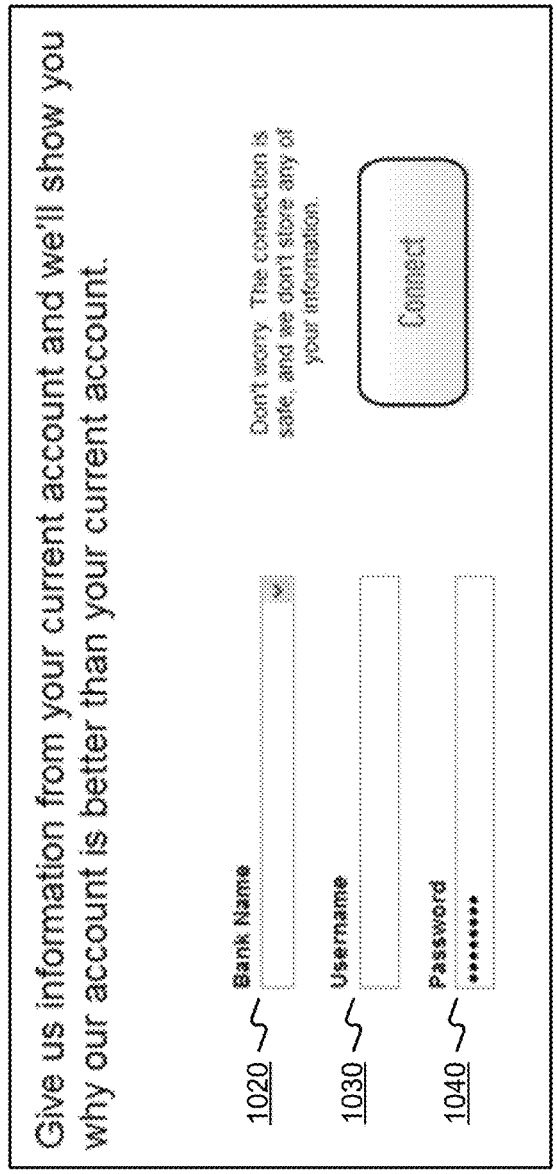
FIG. 10 is an exemplary user-interface for collecting customer account information through provision of account credentials (log in) that may be provided by the disclosed embodiments.

FIG. 10 shows an exemplary user-interface 1000 that may be generated to allow a customer to provide credentials relating to the customer's existing financial account. Switch system 102 may execute software that receives the customer's credentials via responses to the user-interface queries (see FIG. 10, 1020-1040) and use the credentials to automatically access the financial account, and retrieve certain account information from the customer's existing financial account provider associated with the existing financial account. Aspects of the disclosed embodiments include software processes that, when executed by processor(s) 104, generate and provide the content, questions, solicitations, etc. included in the user-interface provided to the customer to upload, receive, and process the account information from another computer system associated with the customer's existing financial account provider. The user-interface of FIG. 10 is exemplary and not limiting to the aspects of the disclosed embodiments. Other formats, types of content, queries, mechanisms for collecting credentials, etc. can be implemented for allowing switch system 102 to receive and process account credentials for a customer. For example, in certain embodiments, switch system 102 may provide ways for a user to upload their pay statement provided by their employer, For example, information from customer-maintained business applications (e.g., financial tracking and management software, such as Quicken®, etc.).

In certain embodiments, switch system 102 may execute scraping engine 113 to perform scraping processes for collecting account data. Alternatively, switch system 102 may request account data from a remote system that performs scraping processes that report collected account data to switch system 102.

Returning back to FIG. 5A, in certain embodiments, switch system 102 may execute parsing engine 111 to perform parsing processes (535). In one embodiment, the parsing process may parse the raw or unformatted account data collected via manual or automated collection processes (as disclosed above) to convert it into usable information for value analyzer 103 and switch analyzer 105. In one aspect, parsing engine 111 may categorize the data into one or more categories, including, for example:

Interest Paid
Monthly cycle/account fee
Overdraft Fee (original/first)
Overdraft Fee (subsequent/pile-on)
ATM Withdrawal Fee (ATM owner)
ATM Withdrawal Fee (Bank)
Number of frequency of deposits made at Bank Teller or ATM
Direct Deposit information
Bill pay information
Auto ACH Debit payment (biller) information
ACH Credit (e.g. annuity or investment income) information
Auto Debit Card payment information For example, the collected account information may not specifically identify the types of transaction for that account. One example may involve direct deposit data. A deposit from the customer's employer may not be specifically identified as anything other than a "deposit" for a transaction in the customer's account information. Aspects of the disclosed embodiments perform the parsing process such that it categorizes the transaction as a Direct Deposit transaction. Another example is where "fees" are identified in the account information. Parsing engine 111 may break down these types of transactions into categories, such as an ATM fee from ATM owner category, ATM fee from Bank category, overdraft fee category, monthly account fee category, etc.

In certain embodiments, parsing engine 111 may perform processes that identify types of transactions based on transaction codes provided in the collected account data. For instance, accounts statements uploaded by switch system 102 may include codes for each transaction in the statement that are assigned by the existing account provider. Parsing engine 111 may compare the transaction codes to stored sets of transaction codes (e.g., stored in a memory internal or external to switch system 102) to determine the type of transaction. Alternatively, parsing engine 111 may perform assessments of account data over a period of time to identify types of transactions. In one embodiment, parsing engine 111 analyze transaction data for the customer's account activities over the previous two months, although other periods of time may be considered. Based on the amount of the transactions, the frequency of those transactions, the recipient (if any) of the transactions, etc., parsing engine 111 may determine that a particular transaction is to be categorized as a bill pay, ACH, direct deposit, fee, or other type of category. Thus, for example, parsing engine 111 may identify a transaction of $300.00 that occurs on the 15$^{th}$ of every month for the past six months and is provided to an account for the customer as a direct deposit transaction category.

With reference now to FIG. 5B, switch system 102 may also execute software processes (e.g., value analyzer 103) that analyze the collected account information for the customer's existing financial account (or other customer-related data, such as pay statements, etc.) (540). In one embodiment, switch system 102 executes software processes that may analyze the parsed account information provided by parsing engine 111 and determine a value to the customer if the customer switches to a new account provided by financial account provider 110. In one aspect, value analyzer 103 may compare one or more parameters of the existing account to parameters of a new account, which financial account provider 110 offers to the customer. For example, switch system 102 may execute software that compares interest rates, late fees, overdraft fees, balance threshold fees, maintenance fees, etc. for both accounts, in order to determine a value reflecting savings to the customer if the customer switches to the new financial account. In certain embodiments, switch system 102 may store in a memory one or more account parameters for the new financial account for access in the comparison processes. Alternatively, switch system 102 may request and receive the new account parameters from another system that stores and/or generates the new account parameters.

Figure 11A:
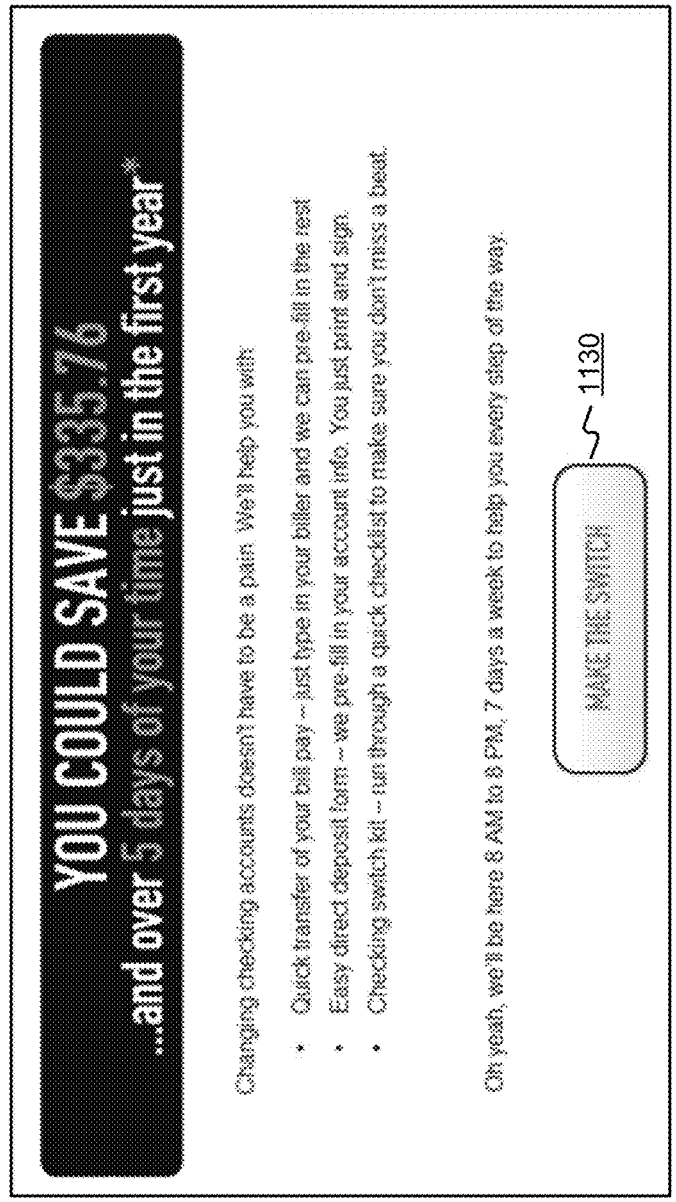
FIG. 11A is an exemplary user-interface for providing account switch analysis results that may be provided by the disclosed embodiments.

As shown in FIG. 5B, value analyzer 103 may be configured, when executed by processor(s) 104, to generate and provide savings information based on the analysis of the existing account information (545). In another embodiment, switch system 102 may provide the savings information in a user-interface that is sent to client 114 for display to the customer. FIG. 11A shows an exemplary user-interface 1100 that includes savings information that may be provided by switch system 102. In other embodiments, switch system 102 may generate and provide a message that includes the saving information to the customer via email, text, automated phone call, etc. In certain embodiments, switch system 102 provides the savings information along with an option for the customer to select to switch accounts. In other embodiments, switch system 102 may generate an option that is presented on the user-interface showing the savings information that, when selected, provides information showing how switch system 102 determined the savings information for the customer. FIG. 11B shows an exemplary user-interface 1100 that may be provided in response to the customer selecting the above-described option that includes information showing exemplary characteristics of the customer's new account, 1170-1190, and transactions relating to the customer's previous account that may need to be switched, 1160.

Returning to FIG. 5B, switch system 102 may receive the customer's selection to switch accounts over network 112 (or other mechanisms) (555) in response to the switch system 102 providing an offer to switch accounts for the customer, 550. Based on the customer's response, switch system 102 may perform processes that create or initiate the creation of the new financial account for the customer (560). Methods and systems known to one of ordinary skill in the art may be implemented to allow financial account provider 110 to create and open the new financial account for the customer. The new financial account may include one or more parameters consistent with the type of financial account opened, such as interest rate, balance thresholds, late payment due dates, etc.

Figure 12:
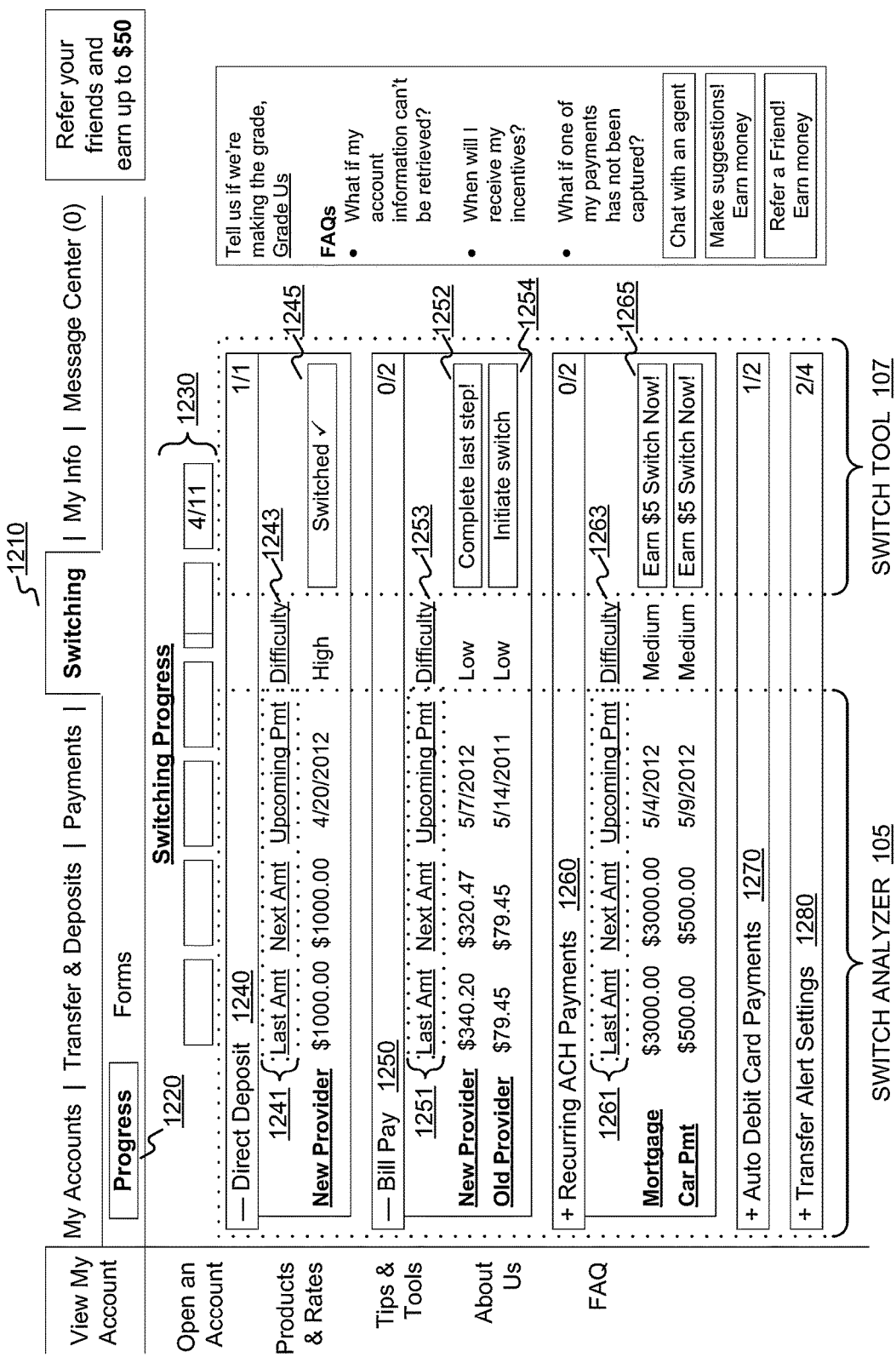
FIG. 12 is an exemplary user-interface that may be provided by the disclosed embodiments.

With reference now to FIG. 5C, switch system 102 may also execute switch analyzer 105 to identify and determine transactions that need to be configured for the new financial account (565). For example, switch analyzer 105 may identify direct deposits transactions, bill pay transactions, ACH payment transactions, automatic debit card payment transactions, balance transfer transactions, etc. that can be configured for the new financial account. In one embodiment, switch analyzer 105 may generate a user-interface (or provide information that is used to generate the user-interface) that includes the status of switch activities relating to the transactions and other features of the new account, and the status of the switch process for the new account (575). Switch system 102 may also execute switch tool 107 to perform processes that provide automated switching of transactions relating to the new financial account. Switch system 102 may also include in the switch status user-interface one or more triggers that allow the customer to initiate transaction switches and see the status and progress of the switch process for the transactions. FIG. 12 shows an exemplary user-interface 1200 that includes switch status information (e.g., FIG. 12, 1210-1220) for the new financial account consistent with certain embodiments.

In one embodiment, switch analyzer 105 may execute processes that identify types of transactions that may need to be switched based on information included in the collected previous account information for the customer. For example, in certain embodiments, uploaded account statements (or pay statements, etc.) may include transaction descriptions, codes, identifiers of institutions, etc. that switch analyzer 105 recognizes as associated with certain types of transactions. For instance, switch analyzer 105 may recognize transaction codes that reflect known direct deposit transactions, etc. Switch analyzer 105 may use this information to identify transactions that may need to be switched. In other embodiments, switch analyzer 105 may perform processes that identify types of transactions based on an analysis of the frequency, amounts, etc. of certain payments, deposits, withdrawals, etc. from the customer's previous account over a period of time. Thus, in one example, switch analyzer 105 may analyze the customer's previous account activities for the past two months to identify reoccurring transactions of a consistent amount. Based on this analysis (and maybe confidence level calculations as disclosed above), switch analyzer 105 may identify a transaction as a direct deposit, bill pay, ACH, or other type of transaction.

For example, in certain embodiments, switch system 102 may execute switch analyzer 105 and/or switch tool 107 to perform automated functions for configuring direct deposit transactions, bill pay transactions, and ACH payment transactions for the new financial account based on customer input. In one aspect, switch system 102 may identify a direct deposit transaction that was previously implemented in the customer's previous financial account based on the review by the value analyzer 103. Switch analyzer 105 may then configure a new direct deposit transaction for the new financial account, and generate and provide the transaction information in the status user-interface 1200 as exemplified in FIG. 12 (e.g., "Direct Deposit 1240"). The user-interface can be configured to show the customer the details for the direct deposit transaction, including the amounts of the transaction and scheduled dates for upcoming transactions. The same type of processes can be performed in connection with other types of transactions, such as the bill pay 1250 and ACH payment transactions 1260 shown in FIG. 12.

Switch system 102 may also execute software that allows the user to edit, add to, or delete from the list of items to be switched. This would be necessary in cases where the transaction could have been mistakenly categorized or mistakenly added to left off the list.

Switch system 102 may also execute software that generates and provides for display in the user-interface, selection buttons (or similar user-friendly triggers) that allow the user to select whether to initiate the switch for the transaction. FIG. 12 shows exemplary buttons (e.g., "Initiate switch" 1254) that may be provided by switch system 102. Switch tool 107 may receive a user's response for initiating a switch through the user-interface trigger and perform processes that automatically configure and set up the selected transaction for the new account. In certain embodiments, switch system 102 may also execute software that monitors the status of the selected transaction switch, and based on the monitoring, generates status information for that transaction switch (see, e.g., FIG. 12, 1245, 1252). Switch tool 107 may perform the status monitoring processes. In one aspect, switch tool 107 may generate content that is provided in the user-interface that reflects the status of the selected transaction switch, such as the status "Complete last step!" 1252 status content shown in FIG. 12. Switch system 102 may provide other types of status information in the user-interface, such as transaction switch completions, e.g., 1245, necessity of user involvement in switching activity (where automation may not be possible), e.g., 1252, and content reflecting an overall progress of the account switch (e.g., "Switching Progress" 1230 status bar). In certain embodiments, switch system 102 may provide access via the user-interface to information (such as electronic documentation) confirming the status of each transaction. Other aspects of the disclosed embodiments include providing incentives in the user-interface (e.g., FIG. 12, 1265) that when selected by the customer, cause switch system 102 to associate the customer's new financial account with award credits (e.g., award points that are redeemable for monetary or merchandise items). Switch system can provide different formats for providing the status of a transaction switch. For example, as shown in FIG. 12, each transaction may be presented with a status representation reflecting the progress of the transaction switch (e.g., "½" (e.g., 1270), "0/2" (e.g., 1250, 1260) "1/1" (e.g., 1240), etc.). Switch system 102 may implement color codes, audio feedback, animations, and other types of graphical content to provide transaction switch progresses.

Switch system 102 may also be configured to monitor aspects of the switch process and identify when problems occur or may occur with transactions associated with the customer's existing financial account and/or the new financial account provided by financial account provider 110. For example, switch system 102 may execute software that identifies upcoming due dates for automated payments and generates alerts that, when presented in the user-interface by switch system 102, warn the customer of potential due dates for such transactions (e.g., FIG. 12, 1241, 1251, 1261). In one aspect, switch analyzer 105 may perform processes that automatically create alert settings that were configured in the customer's previous financial account for the new financial account provided by financial account provider 110. Thus, if the customer had previously configured the previous financial account to provide alerts to warn the customer when the customer's previous account balance fell below a certain threshold, switch analyzer 105 may automatically configure a similar alert setting for the new financial account. Switch system 102 may execute software that generates content 1280 providing option(s) to the customer for initiating the transfer of such alert settings.

Returning to FIG. 5C, switch system 102 may also perform processes that determine the difficulty level of performing transaction switches (570). In one embodiment, switch system 102 may execute difficulty assessment engine 115 to perform processes for determining difficulty levels for switching transactions. For example, switch system 102 may determine and generate a difficulty level that reflects a level of difficulty (e.g., high, medium, low) for performing switches involving direct deposit, bill pay, ACH, etc. and other transactions. FIG. 12 shows exemplary difficulty level representations (see 1243, 1253, 1263) that difficulty assessment engine 115 may generate for display in a user-interface provided to the customer. In certain aspects, difficulty assessment engine 115 may perform processes that determine the difficulty level based on the amount of user-involvement needed to complete the transaction switch. For instance, difficulty assessment engine 115 may determine (via executed software processes) that switching direct deposits is more difficult than other transactions because the customer is required to provide more information to allow switch system 102 to complete the switch. Other types of transaction switches that require little or no user input may be associated with a low difficulty level. Switch system 102 may generate information based on these analyses that reflect the difficulty level (e.g., textual, graphical, color coded, animations, etc.).

Aspects of the disclosed embodiments include software processes that, when executed by processor(s) 104, generate and provide the content, questions, solicitations, etc. included in the user-interface exemplified in FIG. 12. The user-interface of FIG. 12 is exemplary and not limiting to the aspects of the disclosed embodiments. Other formats, types of content, queries, mechanisms for collecting user responses, and presenting information, etc. can be implemented to allow switch system 102 to receive and process transaction switching for a customer's new financial account. Further, switch system 102 includes software that when executed by one or more processors receives, analyzes, and processes transaction switching functions based on the input provided by the customer via the user-interface (or other communication mechanisms). For instance, switch system 102 may execute switch tool 107 to receive and parse a customer's selection to initiate a switch for a bill pay transaction. Switch tool 107 may be configured to, when executed by a processor, perform processes that set up automated bill payments for the new financial account using the parameters associated for a corresponding bill pay in the customer's previous financial account. In one aspect, switch tool 107 may communicate, work with, or otherwise collaborate with value analyzer 103 and/or switch analyzer 105 to receive and process information to perform the automated switching features of the disclosed embodiments.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in hardware alone. Moreover, the disclosed embodiments may be implemented as a combination of automation and assisted manual switching. Additionally, although disclosed aspects are described as being stored in a memory on a computer, one skilled in the art will appreciate that these aspects can also be stored on other types of computer-readable media, such as secondary storage devices, like hard disks, floppy disks, a CD-ROM, or other forms of RAM or ROM. In addition, an implementation of software for disclosed aspects may use any variety of programming languages, such as Java, C, C++, JavaScript, or any other now known or later created programming language.

Other embodiments will be apparent to those skilled in the art from consideration of the specification and practice of the embodiments disclosed herein. It is intended that the specification and examples be considered as exemplary only, with the true scope and spirit being indicated by the following claims. For example, switch system 102 may be configured to provide one-click switching of transaction activities through a user-interface, such as the interface exemplified in FIG. 12. Switch system 102 may also provide one-click or expedited financial account opening processes. In certain embodiments, switch analyzer 105 and switch tool 107 may work collectively to provide such one-click features. In certain aspects, a customer may only have to select an offer to perform the switch that is presented on a user-interface. In response, switch system 102 may perform the switch processes disclosed herein to switch the customer's account. Switch system 102 may generate user-interface(s) that are provided to client 114, which reflect that the customer's account has been switched, and identify the transactions that have been switched, are in the process of being switched, or cannot be switched without further input from the customer.

The disclosed embodiments may be performed with clients 114 that are mobile devices or tablets through mobile applications that provide communications with the functionalities of switch system 102 as disclosed herein. Switch system 102 may also be configured to execute software that performs a fee calculator process that can be invoked by a customer through an option presented on a user-interface displayed by client 114. The fee calculator process may calculate fees that the new financial account may encounter based on the customer's activities relating to the customer's previous financial account (see, e.g, FIG. 2, 201-202). Switch system 102 may also execute software that generates incentives (both real and virtual) that are presented to potential customers via a user-interface offering the account switch or in other user-interfaces provided during the switch offering and/or process, such as the user-interfaces exemplified in FIGS. 6-12. Switch system 102 may also execute software that performs a gamification process, which provides incentives for customers who agree to perform switch-related activities, like switching accounts, or switching or initiating particular transactions within the new account or sharing their switch experiences on social networks (see, e.g., FIG. 2, 206). In other embodiments, switch system 102 may execute software that determines a crowd sourced estimate of time that it takes for the customer to make the switch to the new financial account (see, e.g, FIG. 2, 208). Such estimates may be based on, for example, the amount of time it took similarly situated people to complete an account switch using the disclosed embodiments. In other aspects, switch system 102 may execute software that performs social sharing processes that enable a customer to link to social networking Web sites to share their experience with other social networking users (see, e.g, FIG. 2, 208). Also, switch system 102 may be configured to execute software that performs a switch back service, which would reverse the switching process in the event the customer is not satisfied.

The customer would be switched back to the same type of account at the banking institution they originally switched from, so that all Direct Deposit, Bill Pays, and ACH activity would be processed from the original account once again.

In other embodiments, switch system 102 may not be associated with any particular financial account provider or any type of account provider, but rather it may be associated with a third party system that is leveraged by account provider(s) to perform the account switch processes disclosed herein. For instance, a business may implement the disclosed embodiments such that it offers account switching services for other businesses (e.g., other financial account providers). For example, a business entity may host and provide switch system 102 and its functionalities such that switch system 102 performs account switch processes on behalf of one or more account providers. The hosting switch system entity may charge fees for such services, and those fees may be adjusted based on the types of switch services provided, the number of switched accounts completed, or other fee arrangements. In such embodiments, one or more of the switch processes may be performed by an account provider, while others performed by the third party switch system 102. Alternatively, switch system 102 may perform all of the switch processes for a customer and report results to an account provider through known computer systems and networking components.

Other aspects of the disclosed embodiments maybe implemented. For example, FIG. 13 shows exemplary fields that may be provided by value analyzer 103 (or switch system 102) to collect account information from a customer. For example, the value analyzer 103 may provide a field requesting the average amount kept in the previous account, 1310. The value analyzer 103 may provide a field requesting an amount, if any, of checking account monthly fees, 1320. The value analyzer 103 may provide a field requesting an amount of overdraft fees paid in the last three months, 1340. The value analyzer 103 may provide a field requesting a number of checks deposited at a teller or ATM machine in the last three months, 1350. The value analyzer 103 may provide a field requesting an interest rate (APY) on the previous account, 1370. The value analyzer 103 may provide a field requesting a number of times per month that payment is made to the bank maintaining the previous account for withdrawal of funds from a ATM, 1380. Value analyzer 103 may also determine and present expense information (1330, 1390) and savings information (1361, 1362, 1363) for customers in the format (or other types of formats) shown in FIG. 13.

FIG. 14 shows exemplary logic that may be implemented by switch system 102. In one embodiment, switch system 102 and/or value analyzer 103 may perform logic that processes customer input information ("customer input" 1460 shaded in FIG. 14) to calculate savings information 1410, 1470 based on assumed, or collected account data, e.g., 1440. For example, value analyzer 103 may determine ATM fees 1450 for a customer's previous account based on the number of fees paid per month for the previous account and an assumed (or actual) fee amount. Similarly, value analyzer 103 may determine overdraft fees 1420 based on collected customer information regarding the amount of overdraft fees experienced over a determined period of time, and the fee amount. Temporal information may also be determined. Value analyzer 103 may collect information regarding how many times the customer deposited checks 1430 at a financial account provider over a determined period of time and determine, based on average times for performing such transactions, the amount of time the customer may save by avoiding manual check deposits through remote deposit capture (deposit by taking a picture in a mobile application). The logic shown in FIG. 14 is exemplary and other information may be collected and processed by the logic performed by value analyzer 103 consistent with the disclosed embodiments.

Figure 15:
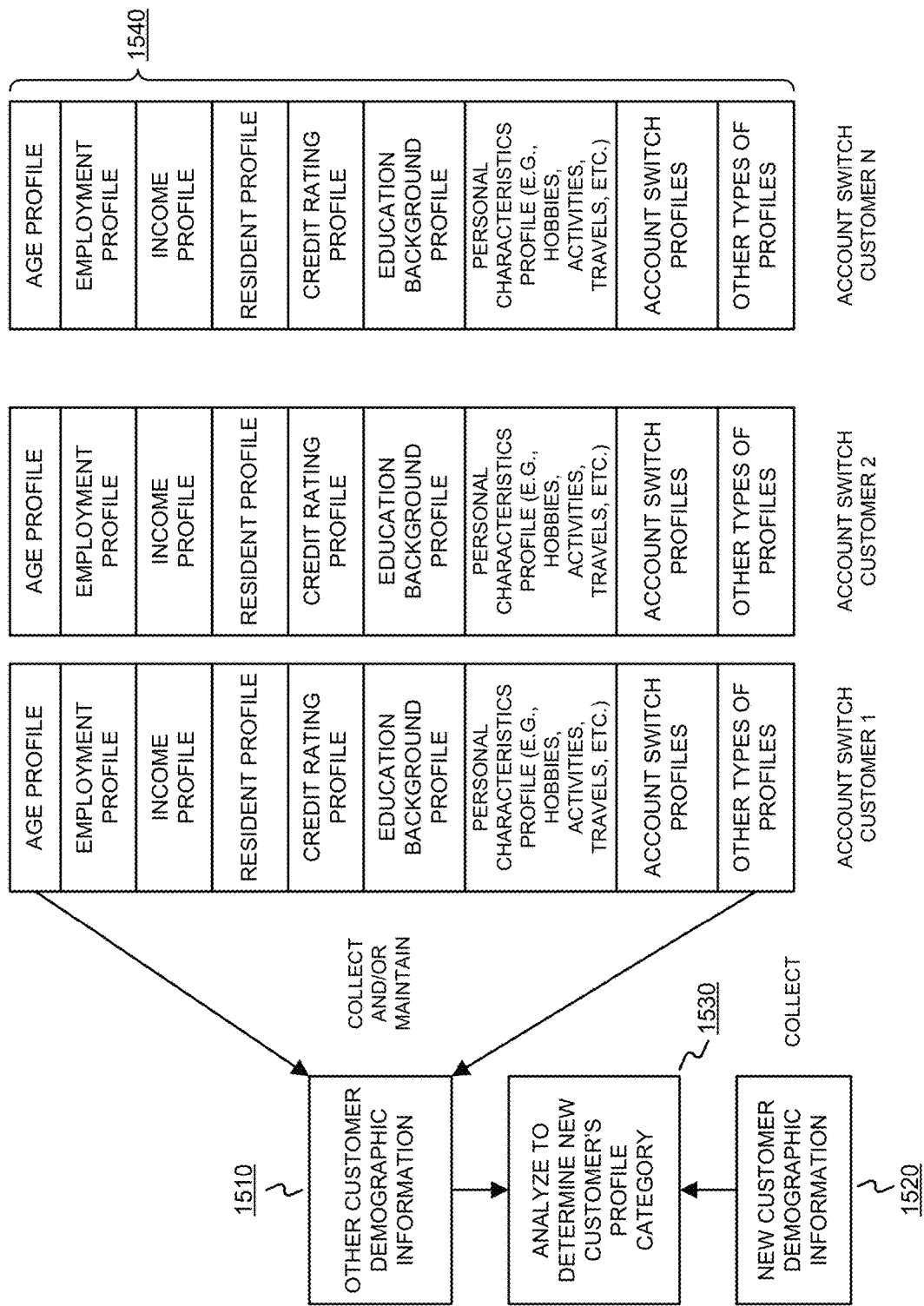
FIG. 15 shows an exemplary customer demographic analysis process consistent with the disclosed embodiments.

With reference to FIG. 15, in other embodiments, switch system may perform processes that collect (e.g., 1510, 1520), analyze (1530), and compare demographic information (e.g., 1540) for customers of the disclosed switch process embodiments. For example, switch system 102 may execute a demographic analysis software process (which may be stored in memory 108 and executed by processor(s) 104), that tracks and/or collects information relating to customers who previously initiated and completed account switches provided by switch system 102 (1510). Switch system 102 may collect and maintain the customer demographic information 1540, or it may request and receive some or all of the information from other systems that provide demographic information. In certain embodiments, the demographic analysis software process may compare profiles, relating to other customers with the determined profile of the new customer to identify similarly situated customers as the new customer. For instance, the new customer may match customers associated with a first category of customers because the customer matches a certain set of profile data with those customers associated with the first category (e.g., similar age, employment, income, residency location (zip code, etc.), credit rating, educational background, hobbies, travel preferences, etc.). In one embodiment, switch system 102 may execute processes that provide options for the customer to select a peer group. In response to the customer's selected peer group, switch system 102 may determine an estimate of values to other customers in that peer group and generate content that reflects that information for display in a user-interface of client 114. Switch system 102 may provide the peer group options in the form of drop-down menus, radio buttons, text entry, and any other type of user-interface selection content.

Switch system 102 may also collect account switch profile information for the account switch customers that includes data reflecting characteristics for each respective customer's switching process experience (e.g., how long it took to switch accounts using switch system 102, how accounts were switched, the types of accounts, the number and types of transactions, incentives provided for switching, fees saved, etc.). Once the new customer's profile category is determined, the demographic analysis software process may provide that information to value analyzer 103. As illustrated in FIG. 15, customer demographic information 1540 may include, but is not limited to, an age profile, employment profile, income profile, resident profile, credit history, educational background information, customer-specific information (such as hobbies), and account switching history. Based on the information provided by the demographic analysis software process, Value analyzer 103 may determine average values for one or more account switch profile data that can be provided to the new customer, such as when switch system presents savings information to the customer via a user-interface. For example, the account savings user-interface provided to the customer may include statistic information, such as a message similar to "people like you saved $X when they switched accounts" or "people from [new customer's college, zip code, who work at your company, family members, friends, business partners, similar incomes etc.] saved $X or Y amount of time when they switch accounts." Additionally, the demographic analysis software process may determine customized marketing messaging for presentation to various profiles.

Other types of statistics, profile information, etc. may be collected, and used to provide messages to new customers consistent with the disclosed embodiments. For example, seasonal or temporal profile information may be used to determine statistic information. For instance, switch system 102 may determine (or collect from another system) statistics that reflect account habits based on the time of year, such as what percentage of customers (or non-customers) overdraft accounts in December or during certain Holidays, etc. The seasonal or temporal information may be combined with the demographic information to provide statistics for new customers considering switching to the new account provided by the account provider leveraging switch system 102.

In certain embodiments value analyzer 103 may perform simulated account use processes to determine the savings for the customer. For instance, switch system 102 may determine, collect, and maintain bank profile information relating to the customer's previous account ("bank profile"), non-bank profile information relating to, for example, the demographic information and category for the customer or other customers, and input provided by the new customer. Value analyzer 103 may use the bank, non-bank, and user-provided profile information to simulate the customer's usage of the new account offered by account provider 110. For example, value analyzer 103 may use the collected bank profile information to determine account usage for the new account over a period of time (e.g., 12 months, etc.). Thus, in one example, value analyzer 103 may determine the user's average account usage savings (or non-savings) based on the new account's interest rate, overdraft fee structure, late fee structure, incentive reward structure, minimum payment or balance structure, etc. The customer's simulated account usage may be adjusted based on the non-bank profile information. For instance, value analyzer 103 may be configured to execute simulation processes that adjust any determined fees, interest, etc. based on seasonal, temporal, personal profile, or other types of non-bank profiles determined for the customer. In one example, value analyzer 103 may determine that while the bank profile simulation analysis results in the customer saving $400.00 in fees, the customer's demographic profile analysis shows an estimated proclivity to overdraft in December and August. As such, value analyzer 103 may adjust the initial determination of $400.00 of savings to $200.00 to reflect the customer's non-bank profile characteristics.

Figure 16:
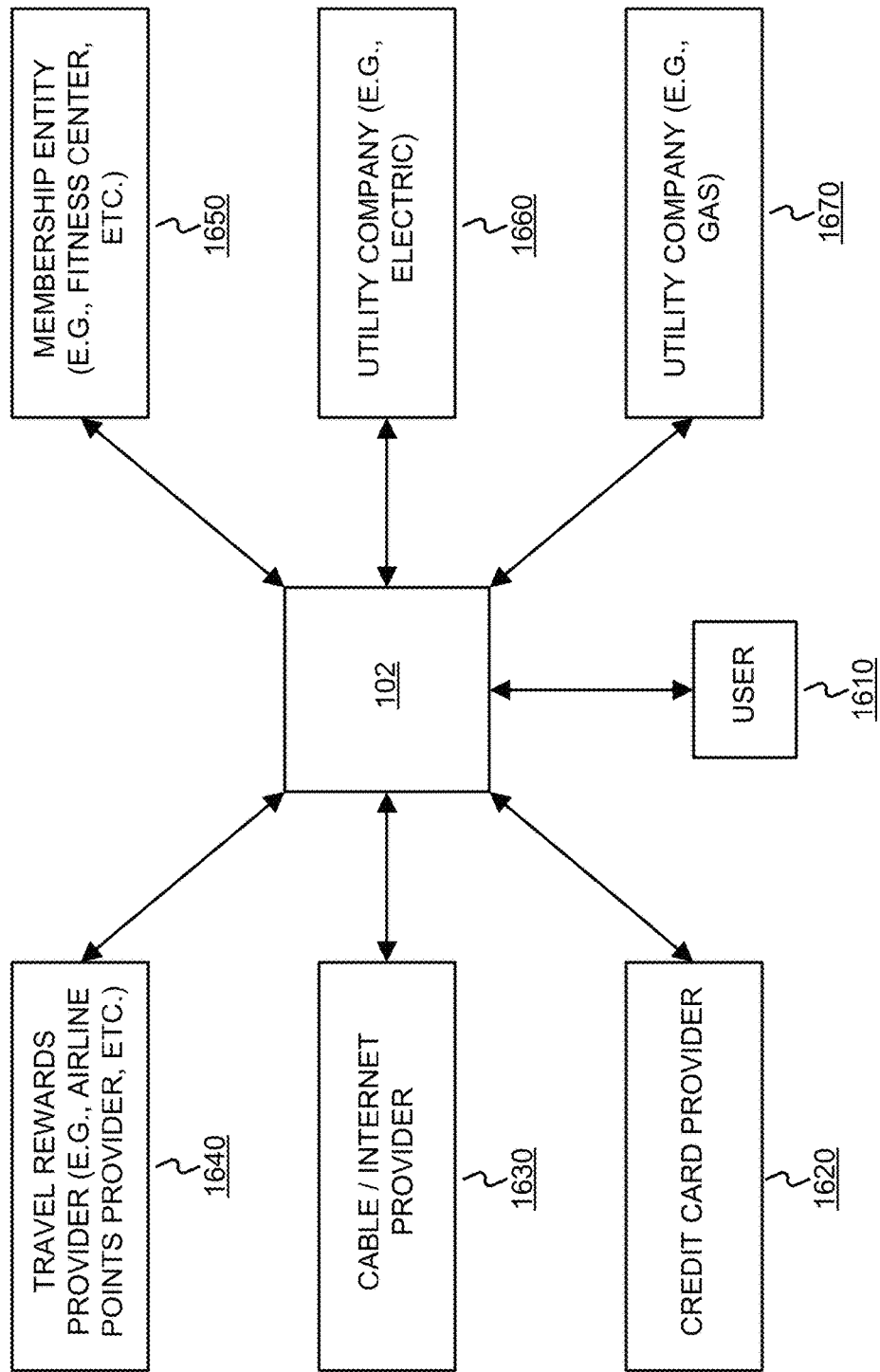
FIG. 16 shows an exemplary configuration for providing switch processes associated with one or more different types of accounts consistent with the disclosed embodiments.

In addition, the disclosed embodiments may not be limited to any particular type of account or device. That is, instead of financial accounts, aspects of the disclosed embodiments may be implemented to provide switching processes for any type of account (e.g., financial, memberships, utilities, phone services, etc.). Additionally, instead of interaction through computer, the disclosed embodiments may be implemented through a smartphone, tablet or other mobile device, etc. Further, the disclosed embodiments may be provided as a one-stop online location for providing switching services for one or more different types of accounts. As shown in FIG. 16, in one embodiment, a business entity may host switch system 102 for direct use by users 1610, such that one or more accounts can be switched for various purposes. For instance, in situations where a user 1610 physically relocates a place of residence, switch system 102 may perform switch processes that enable the customer to switch utility information to the new residence. Further, embodiments may include applying the disclosed switch processes to assist a customer to switch transactions associated with membership businesses (e.g., 1650) (e.g., fitness center fees, and social activity memberships, such as zoo memberships, library card information, student accounts at educational institutions, etc.). Further, switch system 102 may provide account switch processes for business entities for similar purposes.

In such embodiments, switch system 102 may be configured to execute processes that requests and receives biller specific switching instructions from a third party vendor. For example, switch system 102 may perform switch processes for a user requesting to switch account information for a specific type of service (e.g., utility 1660-1670, gym membership 1650, credit card provider 1620, cable/Internet provider 1630, travel rewards provider 1640, etc.). A third party vendor system may offer services that collect and maintain instructions regarding how to switch users to specific billers (e.g., electrical utility company 1660). Switch system 102 may request the switch instructions for the specific biller, and use that information in its switch process to perform the account switch for the user. Switch system 102 may perform processes that determine fees to charge the user for these types of switches.

Aspects of the disclosed embodiments include collecting certain types of information relating to a customer's previous account to perform the value analyzer functions disclosed herein. For example, in certain embodiments, value analyzer 103 may require certain types of information relating to a customer's previous account in order to determine the account switch savings. These may be:

Interest Paid
    Monthly cycle/account fee
    Overdraft Fee (original/first)
    Overdraft Fee (subsequent/pile-on)
    ATM Withdrawal Fee (ATM owner)
    ATM Withdrawal Fee (Bank)
    Number of frequency of deposits made at Bank Teller or ATM Switch Analyzer 105 may also require, in one example, certain types of information relating to a customer's previous account in order to determine the types of transactions that may need switched. This may include:

Direct Deposit information
    Bill pay information
    Auto ACH Debit payment (biller) information
    ACH Credit (e.g. annuity or investment income) information
    Auto Debit Card payment information
    Transfers to other bank accounts (internal & external) information In other embodiments, switch system 102 may execute software processes that dynamically adjust the content presented in the user-interfaces provided to users based on confidence levels of the information collected and analyzed. For instance, switch system 102 may generate a user-interface for providing savings information, such as that shown in FIG. 11. Switch system 102 may execute processes that analyze how the savings information was calculated to determine a confidence level associated with the savings information. If, for example, switch system 102 determines that the savings information was based on account information that was manually provided by the customer, the confidence level of the calculated savings information may be low because there may be some user-input errors or inaccuracies or the amount of information provided was minimal. However, if switch system 102 determines that the savings information was based on account information that was analyzed via a customer's uploaded account statement, or through credential access, and contained a maximal amount of information, the confidence level of the calculated savings may be high. Switch system 102 may use the confidence level to adjust the user-interfaces provided to customers (e.g., adjust color codes, provide confidence level indicators (e.g., bars, flags, graphics, etc.). Based on the confidence level, switch system 102 may also generate and provide options in the user-interfaces that allow the customer to increase the confidence level of the calculated savings. For example, switch system 102 may generate and provide an option that allows the customer to provide additional information (e.g., upload statements, pay stubs, etc.) that can be reused by value analyzer 103 to perform further calculations to determine potential savings for the customer. In response, switch system 102 may generate and provide an updated user-interface with an adjusted confidence level indication.

Further, the disclosed embodiments are applicable to existing customers of account providers, and are not limited to new or potential customers. For instance, switch system 102 may perform switch processes for existing customers of an account provider to switch direct deposits, ACH transactions, accounts, etc. provided by the same account provider.

What is claimed is:

1. A customer account switching valuation computer system, comprising:
   at least one storage device storing instructions; and
   at least one processor configured to execute the instructions in the storage device to:
   display, on a display device of a client computer associated with a first customer, an offer to switch an existing account to a new account;
   receive, from the client computer, a response to the offer;
   collect, based on the response, account information relating to the existing account, the collecting comprising at least one of:
      generating, on the display device of the client computer, a first user interface requesting the customer to upload an electronic document including the account information relating to the existing account; or
      receiving, via the client computer, user credentials of the existing account and accessing a remote computer system associated with an existing financial account provider to retrieve the account information relating to the existing account;
   parse the collected account information into categories, the parsing comprising:
      comparing a transaction code in the collected information against a stored set of transaction codes; and
      performing assessments of the categorized account information gathered over a predetermined period of time to determine the type of transaction;
   estimate an amount of time to complete a switch from the existing account to the new account, based on amounts of time previously used by second customers to switch accounts through the computer system;
   analyze the categorized account information to determine a value representing savings to the customer for switching from the existing account to the new account, the analysis comprising comparing an existing account parameter of the existing account to a new account parameter of the new account, the new account parameter being received from a system that generates new account parameters;
   provide a representation of a quantity comprising at least one of the value or the estimated amount of time to the client computer;
   generate, on the display device of the client computer, a second user interface, the second user interface comprising the representation and a link for the customer to switch the existing account to the new account; and
   dynamically adjust content presented in the second user interface based on a confidence level of the representation, the confidence level being based on how the representation quantity was calculated, the dynamically adjusted content comprising at least one of updated user interface color codes or adjusted confidence level indicators.

2. The computer system of claim 1, wherein the collected account information comprises unformatted account data and the processor is configured to:
   parse the collected account information into categories by converting the unformatted account data into formatted account data; and
   determine, based on the formatted account data, a category for a transaction associated with the existing account.

3. The computer system of claim 1, wherein the processor is further configured to:
   analyze the collected account information to identify a frequency and amount of a reoccurring transaction included in the collected account information; and
   determine, based on the frequency and amount, the category for the reoccurring transaction.

4. The computer system of claim 1, wherein the processor is further configured to:
   analyze the collected account information to identify a code for a transaction included in the collected account information; and
   determine, based on the code, the category for the transaction.

5. The computer system of claim 1, wherein the categories comprise at least two of interest paid, periodic account fee, initial overdraft fee, subsequent overdraft fee, automated teller machine (ATM) owner withdrawal fee, account provider ATM withdrawal fee, frequency of account provider teller deposits, frequency of ATM deposits, direct deposit, bill pay, automatic ACH biller debit payment, ACH credit, automatic debit card payment, internal transfers to another account, or external transfers to another account.

6. The computer system of claim 1, wherein the processor is further configured to:
   simulate activities for the new account using the categorized account information; and
   determine the value to the customer for switching from the existing account to the new account based on results of the simulation.

7. The computer system of claim 6, wherein the processor is further configured to:
   simulate activities for the new account over a determined period of time using the categorized account information.

8. The computer system of claim 1, wherein the representation of the quantity comprises an overall value representation that indicates an overall monetary savings that the customer will receive by switching accounts.

9. The computer system of claim 1, wherein the processor is further configured to:

determine the value to the customer based on account switching statistics for the second customers that previously switched accounts through the computer system.

10. The computer system of claim 9, wherein the account switching statistics comprise statistics based on demographics of the second customers.

11. The computer system of claim 1, wherein the processor is configured to:
   determine a demographic profile for the first customer; and
   compare the first customer's demographic profile to a stored set of demographic profiles of the second customers to determine the value to the first customer for switching from the existing account to the new account.

12. The computer system of claim 1, wherein the processor is configured to:
   receive a selection from the client computer indicating a selection by the first customer of a peer group;
   determine a peer group value for the second customers included in the peer group; and
   provide a representation of a quantity comprising the peer group value to the client computer.

13. The computer system of claim 1, wherein the processor is configured to:
   receive from the client computer credentials for the existing account;
   request account information for the existing account from an account provider for the existing account using the credentials; and
   collect the account information from the account provider for the existing account.

14. A customer account switching valuation method, comprising:
   displaying, on a display device of a client computer associated with a first customer, an offer to switch an existing account to a new account;
   receiving, from the client computer, a response to the offer;
   collecting, based on the response, account information relating to the existing account, wherein collecting the account information comprises at least one of:
      generating, on the display device of the client computer, a first user interface requesting the user to upload an electronic document including the account information relating to the existing account; or
      receiving, via the client computer, user credentials of the existing account and accessing a remote computer system associated with an existing financial account provider to retrieve the account information relating to the existing account;
   parsing, via a computer processor, the collected account information into categories, wherein the parsing comprises:
      comparing a transaction code in the collected information against a stored set of transaction codes; and
      performing assessments of the categorized account information gathered over a predetermined period of time to determine the type of transaction;
   estimating an amount of time to complete a switch from the existing account to the new account, based on amounts of time previously used by second customers to switch accounts through the computer system;
   analyzing, via the computer processor, the categorized account information to determine a value indicating savings to the first customer for switching from the existing account to the new account, wherein the analysis comprises comparing an existing account parameter of the existing account to a new account parameter of the new account, the new account parameter being received from a system that generates new account parameters;
   providing a representation of a quantity comprising at least one of the value or the estimated amount of time to the client computer;
   generating, on the display device of the client computer, a second user interface, the second user interface comprising the representation and a link for the user to switch the existing account to the new account; and
   dynamically adjusting content presented in the second user interface based on a confidence level of the representation, the confidence level being based on how the representation quantity was calculated, the dynamically adjusted content comprising at least one of updated user interface color codes or adjusted confidence level indicators.

15. The method of claim 14, further comprising:
   parsing the collected account information into categories by converting the unformatted account data into formatted account data; and
   determining, based on the formatted account data, a category for a transaction associated with the existing account.

16. A client device, comprising:
   at least one storage device storing instructions; and
   at least one processor configured to execute the instructions in the storage device to:
      receive, from a remote computer, an offer to switch an existing account provided by a first account provider to a new account provided by a second account provider;
      display the offer on a display device;
      generate, on the display device, a first user interface requesting the user to upload an electronic document including the account information relating to the existing account or receiving input of user credentials of the existing account and accessing a remote computer system associated with an existing financial account provider to retrieve the account information relating to the existing account;
      parse the account information into categories, the parsing comprising comparing a transaction code for a transaction in the account information against a stored set of transaction codes;
      perform assessments of the categorized account data gathered over a predetermined period of time to determine the type of transaction;
      provide a response to the offer to the remote computer;
      receive, from the remote computer, an estimate of an amount of time to complete a switch from the existing account to the new account, the estimated amount of time being determined based on amounts of time previously used by second customers to switch accounts through the computer system;
      receive from the remote computer a representation of a quantity comprising at least one of a value indicating savings to the first customer for switching from the existing account to the new account or the estimated amount of time, wherein the representation is generated based on comparing an existing account parameter of the existing account to a new account parameter of the new account, the new account parameter being received from a system that generates new account parameters;

generate, on the display device, a second user interface comprising the representation and a link for the user to switch the existing account to the new account; and dynamically adjust content presented in the second user interface based on a confidence level of the representation, the confidence level being based on how the representation quantity was calculated, the dynamically adjusted content comprising at least one of updated user interface color codes or adjusted confidence level indicators.

17. The client device of claim 16, wherein the processor is further configured to execute instructions to:

receive from the remote computer a request to provide account data for the existing account; and send the requested existing account data to the remote computer, wherein the value included in the representation is determined based on the existing account data.

18. The client device of claim 17, wherein the request to provide account data for the existing account includes at least one of a request for the customer to upload to the remote computer a copy of an account statement associated with the existing account to the remote computer and a request for the first customer to provide to the remote computer credentials for accessing information for the existing account from the first account provider.

19. The client device of claim 16, wherein the first account provider and the second account provider are the same account provider.

20. The client device of claim 16, wherein the client device is a mobile device, and the instructions in the storage device are embodied in a mobile application.

* * * * *